(12) United States Patent
Mu

(10) Patent No.: US 11,889,509 B2
(45) Date of Patent: Jan. 30, 2024

(54) METHOD AND APPARATUS FOR TRANSMITTING MTC DOWNLINK CONTROL INFORMATION, BASE STATION AND USER EQUIPMENT

(71) Applicant: Beijing Xiaomi Mobile Software Co., Ltd., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 596 days.

(21) Appl. No.: 16/973,326

(22) PCT Filed: Jun. 12, 2018

(86) PCT No.: PCT/CN2018/090881
§ 371 (c)(1),
(2) Date: Dec. 8, 2020

(87) PCT Pub. No.: WO2019/237255
PCT Pub. Date: Dec. 19, 2019

(65) Prior Publication Data
US 2021/0250916 A1 Aug. 12, 2021

(51) Int. Cl.
*H04W 72/04* (2023.01)
*H04W 4/06* (2009.01)
(Continued)

(52) U.S. Cl.
CPC .............. *H04W 72/23* (2023.01); *H04W 4/06* (2013.01); *H04W 4/70* (2018.02); *H04W 72/044* (2013.01)

(58) Field of Classification Search
CPC ..... H04W 4/70; H04W 72/044; H04W 72/23; H04W 4/06
See application file for complete search history.

(56) References Cited

U.S. PATENT DOCUMENTS 9,515,799 B2 * 12/2016 Jang ................... H04L 5/0048
9,660,782 B2 * 5/2017 Jang ................... H04L 5/0092
(Continued)

FOREIGN PATENT DOCUMENTS

CN        102573094 A        7/2012
CN        102624489 A        8/2012
(Continued)

OTHER PUBLICATIONS

State Intellectual Property Office of the People's Republic of China, Office Action and Search Report Issued in Application No. 201880001025X, dated Jan. 13, 2021, 16 pages.
(Continued)

*Primary Examiner* — Alpus Hsu
(74) *Attorney, Agent, or Firm* — Finnegan, Henderson, Farabow, Garrett & Dunner, L.L.P.

(57) ABSTRACT

The present disclosure provides methods and apparatuses for transmitting MTC DCI, base stations, and user equipment. The method includes: determining a DCI transmission region configured for an MTC device, generating and sending control resource configuration information to the MTC device; determining an information detection capability of the MTC device in the DCI transmission region, where the information detection capability indicates whether the MTC device supports searching for DCI from a target resource region; mapping a target physical resource in the DCI transmission region according to the information detection capability and a preset resource mapping mode, where the target physical resource carries the DCI of the MTC device; and transmitting the DCI to the MTC device through the target physical resource mapped in the DCI transmission region. With the methods of transmitting MTC DCI provided by the present disclosure, transmission resources can be effectively utilized.

20 Claims, 11 Drawing Sheets

(51) Int. Cl.
*H04W 4/70* (2018.01)
*H04W 72/23* (2023.01)
*H04W 72/044* (2023.01)

(56) References Cited

U.S. PATENT DOCUMENTS

| | | | |
|---|---|---|---|
| 9,843,429 B2* | 12/2017 | Yi | H04W 4/70 |
| 9,936,506 B2* | 4/2018 | Kim | H04L 5/0064 |
| 10,085,249 B2* | 9/2018 | Park | H04L 5/0053 |
| 10,306,546 B2* | 5/2019 | Park | H04W 68/00 |
| 10,609,733 B2* | 3/2020 | Awad | H04W 74/006 |
| 10,841,911 B2* | 11/2020 | Park | H04L 5/0053 |
| 2013/0100900 A1* | 4/2013 | Lee | H04W 72/51 |
| | | | 370/329 |
| 2017/0094688 A1 | 3/2017 | Lee et al. | |
| 2017/0223725 A1* | 8/2017 | Xiong | H04W 72/23 |
| 2019/0215810 A1* | 7/2019 | Mu | H04L 1/1896 |
| 2020/0100219 A1* | 3/2020 | Takeda | H04W 72/23 |

FOREIGN PATENT DOCUMENTS

| | | |
|---|---|---|
| CN | 107534835 A | 1/2018 |
| EP | 3 537 822 A1 | 9/2019 |
| JP | 2016534611 A | 11/2016 |
| JP | 2018041995 A | 3/2018 |
| JP | 2018506246 A | 3/2018 |
| JP | 2019534649 A | 11/2019 |
| RU | 2656688 C2 | 6/2018 |
| WO | WO 2017/057870 A1 | 4/2017 |
| WO | WO 2018/084672 A1 | 5/2018 |

OTHER PUBLICATIONS

ISA State Intellectual Property Office of the People's Republic of China, Written Opinion of the International Searching Authority Issued in Application No. PCT/CN2018/090881, dated Jan. 30, 2019, WIPO, 9 pages.
Ericsson, "Motivation for New WI on Even further enhanced MTC for LTE", 3GPP TSG RAN Meeting #74, RP-162286, Vienna, Austria, Dec. 5-8, 2016, 8 pages.
Notice of Reasons for Refusal for Japanese Patent Application No. 2020-568768, dated Sep. 5, 2022, 6 pages.
Request for the Submission of an Opinion for Korean Patent Application No. 10-2021-7000752, dated Sep. 7, 2022, 10 pages.
ISA State Intellectual Property Office of the People's Republic of China, International Search Report Issued in Application No. PCT/CN2018/090881, dated Jan. 30, 2019, WIPO, 4 pages.
Rel-16 IoT/MTC email discussion moderator (Ericsson), "New WID on Rel-16 MTC enhancements for LTE", 3GPP TSG RAN Meeting #80, RP-180748, La Jolla, USA, RP-180748, Jun. 11-14, 2018, 3 pages.
State Intellectual Property Office of the People's Republic of China, Office Action and Search Report Issued in Application No. 201880001025X, dated Apr. 15, 2021, 9 pages.
European Patent Office, partial supplementary European Search Report issued in Application No. 18922611.1, dated May 21, 2021, 16 pages.
Examination Report for Indian Application No. 202147000414, dated Jan. 4, 2022.
Notice of Reasons for Refusal for Japanese Application No. 2020-568768, dated Feb. 10, 2022.
Xiaomi Communications, "Initial views on the use of LTE control channel region for DL transmission", 3GPP TSG RAN WG1 Meeting #94, R1-1809173, Gothenburg, Sweden, Aug. 20-24, 2018, 3 pages.
Indonesia Patent Office, Office Action Issued in Application No. P00202100105, Jan. 13, 2023, 3 pages.
European Patent Office, Notification for Correction Issued in Application No. 18922611.1, dated Jan. 30, 2023, 4 pages.
European Patent Office, Extended European Search Report Issued in Application No. 18922611.1, dated Aug. 23, 2021, 15 pages.

* cited by examiner

METHOD AND APPARATUS FOR TRANSMITTING MTC DOWNLINK CONTROL INFORMATION, BASE STATION AND USER EQUIPMENT

CROSS REFERENCE TO RELATED APPLICATIONS

This application is a national phase application based on International Application No. PCT/CN2018/090881, filed Jun. 12, 2018, the content of which is incorporated herein by reference.

TECHNICAL FIELD

The present disclosure relates to the field of communication technology, and in particular to methods and apparatuses for transmitting MTC downlink control information, base stations, and user equipment.

BACKGROUND

MTC (Machine Type Communication) refers to communication between machines with no human intervention. The MTC is widely used in smart cities, such as meter reading; smart agriculture, such as collection of temperature and humidity information; smart transportation, such as shared bicycles, and many other fields. The traditional MTC physical downlink control channel (PDCCH) is deployed in a 4G LTE (Long Term Evolution) frequency spectrum and shares frequency resources and some channels with LTE users.

Specific deployment mode is: in view of a narrowband transmission characteristic of an MTC service, in the LTE system, a PDCCH resource for an MTC system is not mapped to a region corresponding to first 3 OFDM (Orthogonal Frequency Division Multiplexing) symbols in a control channel region, and are not mapped to a physical resource location occupied by a CRS (cell reference signal), but are deployed in a PDSCH (Physical Downlink Shared Channel) resource that carries the data transmission. The PDCCH resource for the MTC system can be used to carry downlink control information (DCI) of the MTC system.

With the development of communication technology, mobile communication networks are gradually evolving to 5G NR (New Radio) networks, and the LTE system may be gradually withdrawn from mobile cellular networks, at which time the spectrum resources of the LTE system will be recultivated to 5G NR spectrum resources. Due to the long lifecycle of the MTC system, which can be more than a decade, the MTC system may still exist even after the LTE system are withdrawn from mobile cellular networks, thus requiring independent deployment of transmission resources for the MTC system. If a PDCCH resource for the MTC system is still deployed according to the related art, a control channel resource in the original LTE system will be idle, resulting in a waste of resources.

SUMMARY

To overcome the problems existing in the related art, embodiments of the present disclosure provide methods and apparatuses for transmitting MTC DCI, base stations, and user equipment, which effectively utilizes transmission resources and enhances transmission efficiency of the DCI in an MTC system.

According to a first aspect of the embodiments of the present disclosure, a method of transmitting MTC DCI is provided, the method is applicable to a base station, and the method includes:
  determining a DCI transmission region configured for an MTC device, generating and sending control resource configuration information to the MTC device;
  determining an information detection capability of the MTC device in the DCI transmission region, where the information detection capability indicates whether the MTC device supports searching for DCI from a target resource region, and the target resource region is a control region of an original LTE system;
  mapping a target physical resource in the DCI transmission region according to the information detection capability and a preset resource mapping mode, where the target physical resource carries the DCI of the MTC device; and
  transmitting the DCI to the MTC device through the target physical resource mapped in the DCI transmission region.

Optionally, the control region includes: a time/frequency region corresponding to first 3 OFDM symbols of a subframe.

Optionally, the preset resource mapping mode includes:
  a first mapping mode configured to map the target physical resource in a data region of the original LTE system; and/or,
  a second mapping mode configured to map the target physical resource in a valid region of a subframe, where the valid region of the subframe is a time/frequency region excluding a cell reference signal resource in the subframe.

Optionally, the data region includes: a time/frequency region corresponding to last 11 OFDM symbols of a subframe.

Optionally, determining the information detection capability of the MTC device in the DCI transmission region includes:
  obtaining device capability information reported by each MTC device; and
  determining the information detection capability of the MTC device according to the device capability information.

Optionally, the device capability information includes: a preset indication value for indicating the information detection capability; and
  determining the information detection capability of the MTC device according to the device capability information includes:
  if the preset indication value is a first indication value, determining that the MTC device supports searching for the DCI from the target resource region; and
  if the preset indication value is a second indication value, determining that the MTC device does not support searching for the DCI from the target resource region.

Optionally, mapping the target physical resource in the DCI transmission region according to the information detection capability and the preset resource mapping mode includes:
  if the MTC device does not support searching for the DCI from the target resource region, mapping the target physical resource in the DCI transmission region according to the first mapping mode.

Optionally, mapping the target physical resource in the DCI transmission region according to the information detection capability and the preset resource mapping mode includes:

determining a target resource mapping mode of the target physical resource, and performing resource mapping, where the target resource mapping mode is the first mapping mode or the second mapping mode;

generating physical resource configuration information according to the target resource mapping mode, where the physical resource configuration information informs the MTC device about a mapping range of the target physical resource; and sending the physical resource configuration information to the MTC device through high-layer signaling.

Optionally, mapping the target physical resource in the DCI transmission region according to the information detection capability and the preset resource mapping mode includes:

if the MTC device supports searching for the DCI from the target resource region, mapping the target physical resource in the DCI transmission region according to a control channel element (CCE) aggregation level.

Optionally, mapping the target physical resource in the DCI transmission region according to the CCE aggregation level includes:

determining a CCE aggregation level of the DCI transmission region;

if the CCE aggregation level is less than a maximum value of CCEs supported by the DCI transmission region, mapping the target physical resource in the DCI transmission region according to the first mapping mode; and if the CCE aggregation level is equal to the maximum value of CCEs supported by the DCI transmission region, mapping the target physical resource in the DCI transmission region according to the second mapping mode.

Optionally, the DCI transmission region includes: mapping regions of different sizes; and mapping the target physical resource in the DCI transmission region according to the CCE aggregation level includes:

determining a CCE aggregation level of a current mapping region;

if the CCE aggregation level of the current mapping region is less than a maximum value of CCEs supported by the current mapping region, mapping the target physical resource in the current mapping region according to the first mapping mode; and if the CCE aggregation level of the current mapping region is equal to the maximum value of CCEs supported by the current mapping region, mapping the target physical resource in the current mapping region according to the second mapping mode.

According to a second aspect of the embodiments of the present disclosure, a method of transmitting MTC DCI is provided, the method is applicable to an MTC device. The MTC device supports searching for DCI from a target resource region, the target resource region is a control region of an original LTE system, and the method includes:

obtaining control resource configuration information from a base station, and determining a DCI transmission region;

determining a target search region according to preset reference information and the DCI transmission region, where the preset reference information includes a blind detection CCE aggregation level or physical resource configuration information sent by the base station; and detecting target DCI from the target search region according to a preset blind detection CCE aggregation level.

Optionally, if the preset reference information includes the blind detection CCE aggregation level, determining the target search region according to the preset reference information and the DCI transmission region includes:

determining a blind detection CCE aggregation level of a region to be detected, where the region to be detected includes the DCI transmission region or a mapping region of the DCI transmission region;

if the blind detection CCE aggregation level is equal to a maximum value of CCEs supported by the region to be detected, determining a valid region of the entire region to be detected as the target search region, where the valid region is a region of the entire region to be detected excluding a cell reference signal (CRS) resource; and if the blind detection CCE aggregation level is less than the maximum value of CCEs supported by the region to be detected, determining the region to be detected excluding the target resource region as the target search region.

Optionally, if the preset reference information includes the physical resource configuration information sent by the base station, determining the target search region according to the preset reference information and the DCI transmission region includes:

determining a preset resource mapping mode of a region to be detected according to the physical resource configuration information, where the region to be detected includes the DCI transmission region or a mapping region of the DCI transmission region;

if the preset resource mapping mode is a first mapping mode, determining the region to be detected excluding the target resource region as the target search region; and if the preset resource mapping mode is a second mapping mode, determining a valid region of the entire region to be detected as the target search region, where the valid region is a region of the region to be detected excluding a CRS resource;

where, the first mapping mode is configured to map a target physical resource in a data region of the original LTE system, and the target physical resource carries the DCI of the MTC device; and the second mapping mode is configured to map the target physical resource in a valid region of a subframe, and the valid region of the subframe is a time/frequency region excluding a CRS resource in the subframe.

Optionally, the method further includes:

reporting device capability information to the base station, where the device capability information indicates whether the MTC device has an ability to search for the DCI from the target resource region, such that the base station maps a target physical resource for carrying the MTC DCI in a preset DCI transmission region according to the device capability information.

According to a third aspect of the embodiments of the present disclosure, an apparatus for transmitting MTC DCI is provided, the apparatus is set in a base station, and the apparatus includes:

a transmission region determining module configured to determine a DCI transmission region configured for an MTC device, generate and send control resource configuration information to the MTC device;

a capability determining module configured to determine an information detection capability of the MTC device in the DCI transmission region, where the information detection capability indicates whether the MTC device supports searching for DCI from a target resource region, and the target resource region is a control region of an original LTE system;

a resource mapping module configured to map a target physical resource in the DCI transmission region according to the information detection capability and a preset resource mapping mode, where the target physical resource carries the DCI of the MTC device; and an information transmitting module configured to transmit the DCI to the MTC device through the target physical resource mapped in the DCI transmission region.

Optionally, the control region includes: a time/frequency region corresponding to first 3 OFDM symbols of a subframe.

Optionally, the preset resource mapping mode includes:
a first mapping mode configured to map the target physical resource in a data region of the original LTE system; and/or,
a second mapping mode configured to map the target physical resource in a valid region of a subframe, where the valid region of the subframe is a time/frequency region excluding a cell reference signal resource in the subframe.

Optionally, the data region includes: a time/frequency region corresponding to last 11 OFDM symbols of a subframe.

Optionally, the capability determining module includes:
a capability information obtaining submodule configured to obtain device capability information reported by each MTC device; and
a capability determining submodule configured to determine the information detection capability of the MTC device according to the device capability information.

Optionally, the device capability information includes: a preset indication value for indicating the information detection capability; and
the capability determining submodule includes:
a first capability determining unit configured to determine that the MTC device supports searching for the DCI from the target resource region in a case where the preset indication value is a first indication value; and
a second capability determining unit configured to determine that the MTC device does not support searching for the DCI from the target resource region in a case where the preset indication value is a second indication value.

Optionally, the resource mapping module is configured to: in a case where the MTC device does not support searching for the DCI from the target resource region, map the target physical resource in the DCI transmission region according to the first mapping mode.

Optionally, the resource mapping module includes:
a mapping mode determining submodule configured to determine a target resource mapping mode of the target physical resource, and perform resource mapping, where the target resource mapping mode is the first mapping mode or the second mapping mode;
a configuration information generating submodule configured to generate physical resource configuration information according to the target resource mapping mode, where the physical resource configuration information informs the MTC device about a mapping range of the target physical resource; and
a configuration information sending submodule configured to send the physical resource configuration information to the MTC device through high-layer signaling.

Optionally, the resource mapping module is configured to map the target physical resource in the DCI transmission region according to a CCE aggregation level in a case where the MTC device supports searching for the DCI from the target resource region.

Optionally, the resource mapping module includes:
a first CCE aggregation level determining submodule configured to determine a CCE aggregation level of the DCI transmission region;
a first resource mapping submodule configured to map the target physical resource in the DCI transmission region according to the first mapping mode in a case where the CCE aggregation level is less than a maximum value of CCEs supported by the DCI transmission region; and
a second resource mapping submodule configured to map the target physical resource in the DCI transmission region according to the second mapping mode in a case where the CCE aggregation level is equal to the maximum value of CCEs supported by the DCI transmission region.

Optionally, the DCI transmission region includes: mapping regions of different sizes; and
the resource mapping module includes:
a second CCE aggregation level determining submodule configured to determine a CCE aggregation level of a current mapping region;
a third resource mapping submodule configured to map the target physical resource in the current mapping region according to the first mapping mode in a case where the CCE aggregation level of the current mapping region is less than a maximum value of CCEs supported by the current mapping region; and
a fourth resource mapping submodule configured to map the target physical resource in the current mapping region according to the second mapping mode in a case where the CCE aggregation level of the current mapping region is equal to the maximum value of CCEs supported by the current mapping region.

According to a fourth aspect of the embodiments of the present disclosure, an apparatus for transmitting MTC DCI is provided, the apparatus is set in an MTC device, and the MTC device supports searching for DCI from a target resource region. The target resource region is a control region of an original LTE system, and the apparatus includes:
a transmission region determining module configured to obtain control resource configuration information from a base station, and determine a DCI transmission region;
a search region determining module configured to determine a target search region according to preset reference information and the DCI transmission region, where the preset reference information includes a blind detection CCE aggregation level or physical resource configuration information sent by the base station; and
a DCI detecting module is configured to detect target DCI from the target search region according to a preset blind detection CCE aggregation level.

Optionally, if the preset reference information includes the blind detection CCE aggregation level, the search region determining module includes:

a CCE aggregation level determining submodule configured to determine a blind detection CCE aggregation level of a region to be detected, where the region to be detected includes the DCI transmission region or a mapping region of the DCI transmission region;

a first search region determining submodule configured to determine a valid region of the entire region to be detected as the target search region in a case where the blind detection CCE aggregation level is equal to a maximum value of CCEs supported by the region to be detected, where the valid region is a region of the entire region to be detected excluding a CRS resource; and a second search region determining submodule configured to determine the region to be detected excluding the target resource region as the target search region in a case where the blind detection CCE aggregation level is less than the maximum value of CCEs supported by the region to be detected.

Optionally, if the preset reference information includes the physical resource configuration information sent by the base station, the search region determining module includes:

a resource mapping mode determining submodule configured to determine a preset resource mapping mode of a region to be detected according to the physical resource configuration information, where the region to be detected includes the DCI transmission region or a mapping region of the DCI transmission region;

a third search region determining submodule configured to determine the region to be detected excluding the target resource region as the target search region in a case where the preset resource mapping mode is a first mapping mode; and a fourth search region determining submodule configured to determine a valid region of the entire region to be detected as the target search region in a case where the preset resource mapping mode is a second mapping mode, where the valid region is a region of the region to be detected excluding a CRS resource;

where, the first mapping mode is configured to map a target physical resource in a data region of the original LTE system, and the target physical resource carries the DCI of the MTC device; and the second mapping mode is configured to map the target physical resource in a valid region of a subframe, and the valid region of the subframe is a time/frequency region excluding a CRS resource in the subframe.

Optionally, the apparatus further includes:

a device capability reporting module configured to report device capability information to the base station, where the device capability information indicates whether the MTC device has an ability to search for the DCI from the target resource region, such that the base station maps a target physical resource for carrying the MTC DCI in a preset DCI transmission region according to the device capability information.

According to a fifth aspect of the embodiments of the present disclosure, a non-transitory computer-readable storage medium is provided, the storage medium stores computer instructions, which, when executed by a processor, implement the steps of any of the methods described in the first aspect.

According to a sixth aspect of the embodiments of the present disclosure, a non-transitory computer-readable storage medium is provided, the storage medium stores computer instructions, which, when executed by a processor, implement the steps of any of the methods described in the second aspect.

According to a seventh aspect of the embodiments of the present disclosure, a base station is provided, the base station includes:

a processor, and a memory for storing instructions executable by the processor, where, the processor is configured to:

determine a DCI transmission region configured for an MTC device, generate and send control resource configuration information to the MTC device;

determine an information detection capability of the MTC device in the DCI transmission region, where the information detection capability indicates whether the MTC device supports searching for DCI from a target resource region, and the target resource region is a control region of an original LTE system;

map a target physical resource in the DCI transmission region according to the information detection capability and a preset resource mapping mode, where the target physical resource carries the DCI of the MTC device; and transmit the DCI to the MTC device through the target physical resource mapped in the DCI transmission region.

According to an eighth aspect of the embodiments of the present disclosure, user equipment is provided, the user equipment includes:

a processor, and a memory for storing instructions executable by the processor, where, the processor is configured to:

obtain control resource configuration information from a base station, and determining a DCI transmission region;

determine a target search region according to preset reference information and the DCI transmission region, where the preset reference information includes a blind detection CCE aggregation level or physical resource configuration information sent by the base station; and detect target DCI from the target search region according to a preset blind detection CCE aggregation level.

The technical solutions provided by the embodiments of the present disclosure may include the following beneficial effects.

According to the methods of transmitting MTC DCI provided by the present disclosure, when a base station deploys a physical downlink control channel resource for an MTC device independently, if the MTC device supports searching for its own DCI from a target resource region, that is, a control region of the original LTE system, the base station can map a target physical resource i.e., a MPDCCH resource, for carrying the DCI of the MTC device in the target resource region, thereby enhancing MPDCCH resource mapping, effectively using system resources, and improving transmission efficiency of the DCI of the MTC device.

It should be understood that the above general description and the following detailed description are merely exemplary and explanatory, and do not limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIGS. 4-1 to 4-3 are schematic diagrams illustrating application scenarios for transmitting MTC DCI according to an embodiment of the present disclosure.

FIGS. 8-1 to 8-4 are schematic diagrams illustrating application scenarios for transmitting MTC DCI according to an embodiment of the present disclosure.

DETAILED DESCRIPTION OF THE EMBODIMENTS

Figure 1:
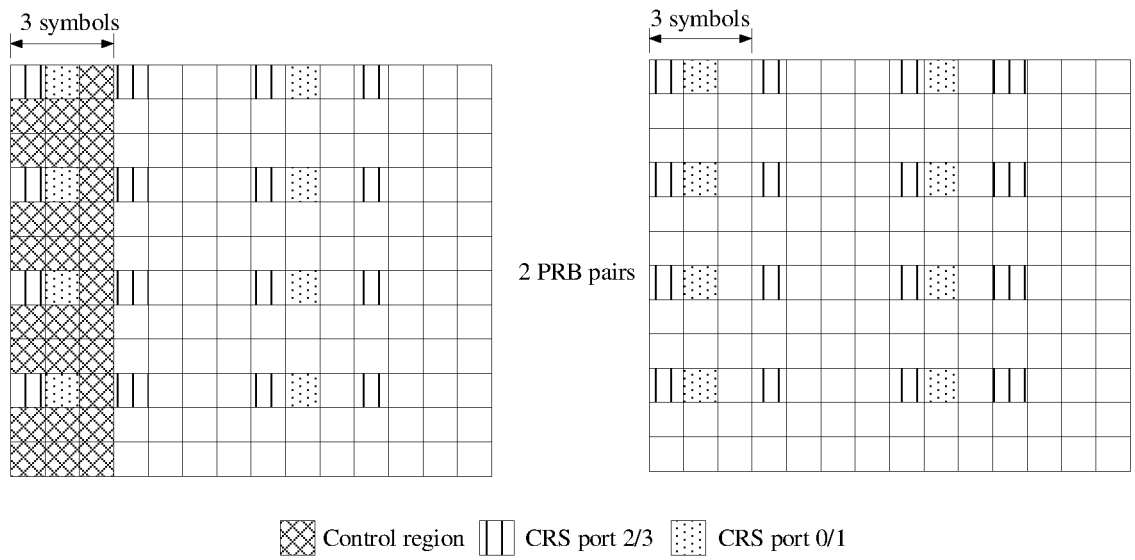
FIG. 1 is a schematic diagram illustrating resource mapping of two PRB pairs according to an embodiment of the present disclosure.

Embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The executive subject of the present disclosure includes: a base station and user equipment (UE) in a 5G network. The base station may be a base station with a large-scale antenna array, a sub-base station with a large-scale antenna array, etc. The UE may be an MTC device, such as a user terminal, a user node, a mobile terminal, a tablet computer, or the like. In the specific implementation process, the base station and the user equipment are independent of each other, and communicate with each other to implement the technical solutions provided by the present disclosure together.

The application scenario of the present disclosure is: the MTC system is independently deployed without being attached to an original 4G LTE system. For example, spectrum resources of the original 4G LTE system are recultivated as spectrum resources of a 5G NR system. In the original LTE system, an MTC device is to share spectrum resources and channels with an LTE user. Due to a narrow-band transmission characteristic of an MTC service, a PDCCH resource for the MTC device, that is a MPDCCH resource, are not deployed, by the LTE system, in a control region, i.e., a time/frequency region corresponding to first 3 OFDM symbols of a subframe. Rather, the LTE system deploys an MPDCCH resource for the MTC device in a data region, i.e., a time/frequency region corresponding to the last 11 OFDM symbols of a subframe. After the LTE system is withdrawn from the mobile cellular network, the control region of the original LTE system, i.e., the time/frequency region corresponding to the first 3 OFDM symbols of a subframe, will be vacant and become a blank resource. Refer to two resource mapping diagrams of PRBs (Physical Resource Blocks) shown in FIG. 1, where the left figure is a schematic diagram illustrating resource mapping of two PRB pairs in the LTE system, and the right figure is a schematic diagram illustrating resource mapping of two PRB pairs in the 5G NR system.

Based on this, the present disclosure provides a method of transmitting MTC DCI. When a base station independently deploys an MPDCCH resource for an MTC device, resources of an original LTE control region can be used to transmit the downlink control information (DCI) of the MTC device, thereby improving transmission efficiency of the MTC DCI.

Figure 2:
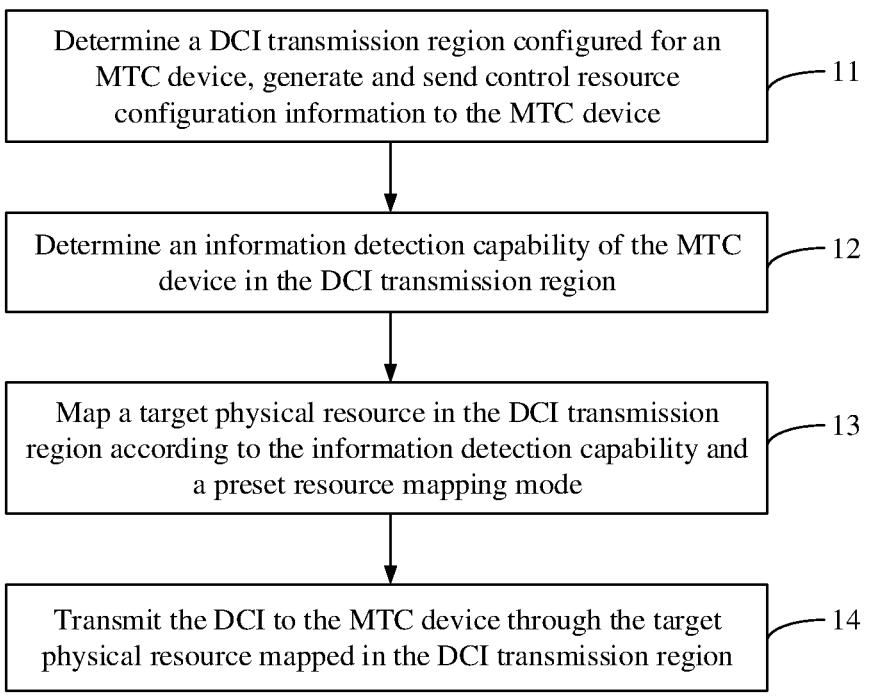
FIG. 2 is a flowchart illustrating a method of transmitting MTC DCI according to an embodiment of the present disclosure.

Refer to FIG. 2, which is a flowchart illustrating a method of transmitting MTC DCI according to an embodiment. The method can be applicable to a base station, and the method may include the following steps.

At step 11, a DCI transmission region configured for an MTC device is determined, and control resource configuration information is generated and sent to the MTC device.

In a 5G NR system, in view of the narrowband transmission characteristics of the MTC device, the base station can determine time/frequency resources corresponding to 2 PRB pairs, 4 PRB pairs, or 6 PRB pairs as the DCI transmission region of the MTC device. Time/frequency ranges of a PRB are: a time slot in the time domain, i.e., 0.5 ms, where one slot is equal to 7 OFDM symbols; and 12 consecutive subcarriers in the frequency domain, and if subcarrier frequency spacing is 15 KHz, the frequency range of a PRB is 180 KHz. A PRB pair occupies 2 slots in the time domain, that is, 1 ms; and includes 12 subcarriers in the frequency domain.

In the present disclosure, the base station configures a DCI transmission region with a preset size, such as 2 PRB pairs, for the MTC device according to a downlink channel condition. The DCI transmission region may be configured to carry the DCI of one MTC device, or may be configured to carry the DCI of multiple MTC devices.

After configuring the DCI transmission region for the MTC device, the base station generates control resource configuration information and sends the control resource configuration information to the MTC device to inform the MTC device from what time/frequency region to detect the DCI belonging to the MTC device itself.

At step 12, an information detection capability of the MTC device in the DCI transmission region is determined.

The information detection capability of the MTC device indicates whether the MTC device supports searching for DCI from a target resource region. The target resource region refers to a control region of the original LTE system, and generally refers to a time/frequency region corresponding to the first 3 OFDM symbols in a subframe, as shown in FIG. 1.

The present disclosure relates to two types of MTC devices. One type of MTC device does not support searching for the DCI from the target resource region, which may be referred to as a first MTC device in the present disclosure. The first MTC device may be an MTC device that uses a transmission protocol of the original LTE system, such as an existing Rel.13 to Rel.15 user. Another type of MTC device supports searching for the DCI from the target resource region, which may be referred to as a second MTC device in the present disclosure.

In the present disclosure, when the base station determines which MTC device is configured with a preset DCI transmission region, it may include two situations.

In the first situation, the base station allocates the preset DCI transmission region for the MTC device by random scheduling. Taking the above two PRB pairs as an example, it is assumed that the corresponding MTC devices include UE 1, UE 2, and UE 3, and the base station does not determine in advance which type of MTC device each of the these MTC devices belongs to.

In the second situation, the base station is targeted to allocate the preset DCI transmission region to MTC devices with the same type by targeted scheduling. For example, pieces of UE scheduled in the two PRB pairs all belong to the second MTC device.

For the first situation above, before mapping an MPDCCH resource for the MTC device in the DCI transmission region, the base station may first monitor the information detection capability of each MTC device, so as to subsequently determine how to map the MPDCCH resource.

In an embodiment, the base station may determine the information detection capability of each MTC device according to obtained operator-related information and device information of each MTC device, such as device category.

Figure 3:
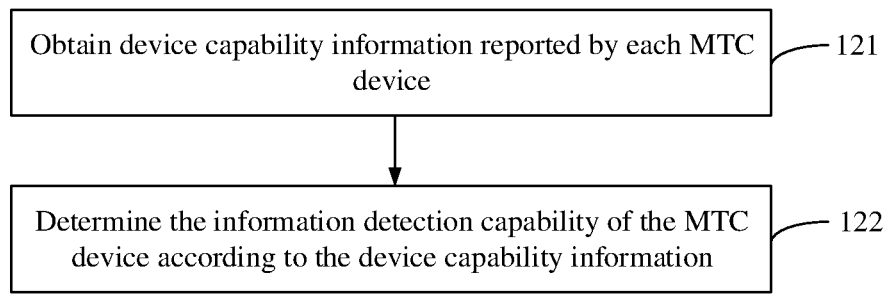
FIG. 3 is a flowchart illustrating a method of transmitting MTC DCI determining an information detection capability of an MTC device according to an embodiment of the present disclosure.

In another embodiment, the base station may also determine the information detection capability of each MTC device through device capability information reported by UE. Refer to FIG. 3, which is a flowchart illustrating a method for determining an information detection capability of the MTC device according to an embodiment. The above step 12 may include the followings.

At step 121, device capability information reported by each MTC device is obtained.

In the present disclosure, the base station may request an MTC device accessed to the cell network to report the device capability information, that is, the MTC device passively reports the device capability information. Alternatively, an MTC device may actively report the device capability information to the base station under a preset trigger condition, such as when accessing the cell network covered by the base station. The device capability information includes at least: information indicating the information detection capability of the MTC device.

At step 122, the information detection capability of the MTC device is determined according to the device capability information.

In an embodiment of the present disclosure, the device capability information may include: a preset indication value for indicating the information detection capability. Thus, step 122 is specifically to determine the information detection capability of the MTC device according to the preset indication value.

In an embodiment, a first preset value may indicate that the MTC device belongs to the first MTC device; and a second preset value may indicate that the MTC device belongs to the second MTC device.

It is assumed that the protocol provisions: one bit in a designated field carrying the device capability information is used to bear the information indicating the information detection capability of the MTC device. The first preset value may be 0, and the second preset value may be 1.

Then the specific implementation process of step 122 is as followings: if the base station detects that the preset bit is set to 0 in the device capability information reported by an MTC device such as UE 1, the base station determines that UE 1 does not support searching for the DCI from the target resource region, i.e., the base station determines that UE 1 belongs to the first MTC device. Conversely, if the base station detects that the preset bit is set to 1, the base station determines that UE 1 supports searching for the DCI from the target resource region, i.e., the base station determines that UE 1 belongs to the second MTC device.

For the second situation above, when configuring the DCI transmission region, the base station has scheduled the same type of MTC devices in a targeted manner, which can directly determine the information detection capabilities of each MTC device in the DCI transmission region.

At step 13, according to the information detection capability and a preset resource mapping mode, a target physical resource is mapped in the DCI transmission region, where the target physical resource carries the DCI of the MTC device.

In the present disclosure, the target physical resource is an MPDCCH resource used to carry the DCI of the MTC device.

According to the different information detection capabilities of the MTC devices in the DCI transmission region, the base station can use the following two mapping modes to map the MPDCCH resource in the DCI transmission region:

The first mapping mode, consistent with the original LTE system, is to map the MPDCCH resource in the data region of the original LTE system, that is, the MPDCCH resource is mapped in the time/frequency region corresponding to the last 11 OFDM symbols of a subframe. For example, the MPDCCH resource is mapped to a blank cell shown on the left side of FIG. 1.

The second mapping mode is to map the MPDCCH resource in a valid region of a subframe, where the valid region refers to a region in a subframe other than a CRS (cell reference signal) resource, and the valid region includes a time/frequency region corresponding to the first 3 OFDM symbols of the original LTE system. As shown in FIG. 1, the MPDCCH resource is mapped to a blank cell shown on the right side of FIG. 1.

In the present disclosure, the base station may map the CRS resource in the DCI transmission region with reference to the original LTE system, see the deployment of CRS port 2/3 and CRS port 0/1 in FIG. 1.

Regarding the mapping of the MPDCCH resource, i.e., the target physical resource, the implementation of step 13 may include two cases.

Case 1: searching for the DCI from the target resource region is not supported by at least one MTC device in the DCI transmission region, that is, there is at least one first MTC device in the DCI transmission region.

In this case, the base station maps the MPDCCH resource in the DCI transmission region according to the first mapping mode.

Figures 1, 4:
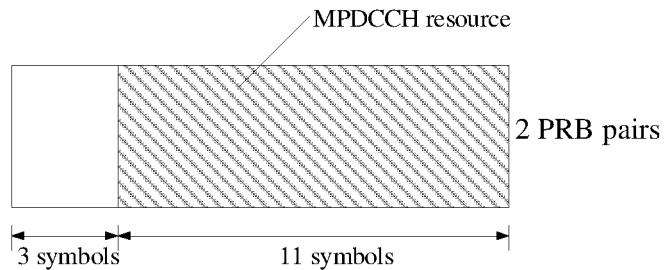
Figures 2, 4:
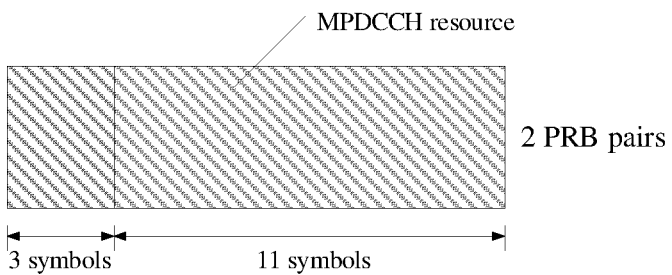
Figures 3, 4:
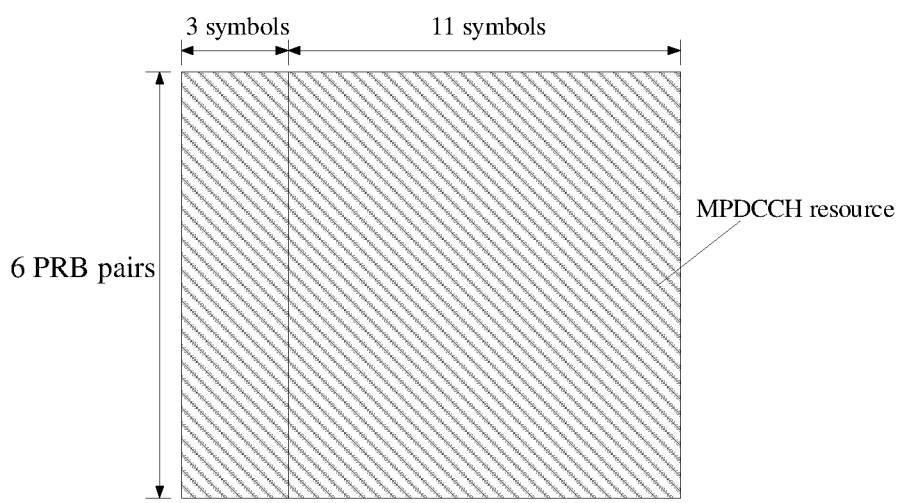

For example, assuming that the DCI transmission region includes 2 PRB pairs, the base station maps the MPDCCH resource in the time/frequency region corresponding to the last 11 OFDM symbols of a subframe according to the first mapping mode, as shown in FIG. 4-1.

Case 2: searching for the DCI from the target resource region is supported by all MTC devices in the DCI transmission region, that is, the MTC devices in the DCI transmission region all belong to the second MTC device.

In this case, the base station can use the following at least two approaches to map MPDCCH resource in the DCI transmission region.

Figure 5:
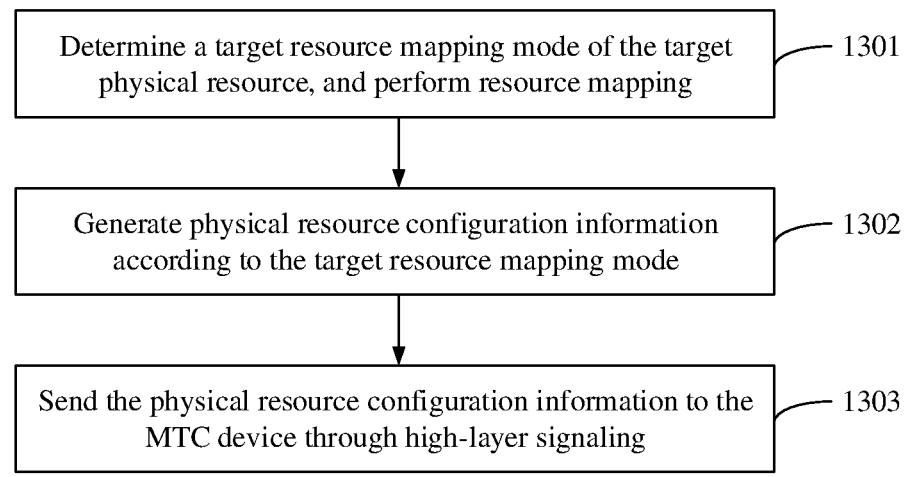
FIG. 5 is a flowchart illustrating a method of mapping a target physical resource in a DCI transmission region according to an embodiment of the present disclosure.

Approach 1: the base station autonomously decides which mapping mode to use to map the MPDCCH resource in the DCI transmission region Referring to FIG. 5, which is a flowchart illustrating a method of mapping a target physical resource in a DCI transmission region according to an embodiment, step 13 may include the followings.

At step 1301, a target resource mapping mode of the target physical resource is determined, and the resource mapping is performed.

In the embodiments of the present disclosure, when the base station determines that all pieces of UE in the DCI transmission region belong to the second MTC device, the base station may determine whether to use the first mapping mode or the second mapping mode according to requirements such as configuration flexibility, scheduling flexibility, and so on. And according to the target resource mapping mode, the base station maps the target physical resource, i.e., the MPDCCH resource, in the DCI transmission region.

At step 1302, physical resource configuration information is generated according to the target resource mapping mode, where the physical resource configuration information informs the MTC device about a mapping range of the target physical resource.

In the embodiments of the present disclosure, after the base station maps the MPDCCH resource in the DCI transmission region according to the target resource mapping mode determined by itself, the base station may also generate the physical resource configuration information according to the target resource mapping mode, such that the MTC device in the DCI transmission region is informed about the mapping range of the MPDCCH resource.

In an embodiment, the physical resource configuration information may include: a target resource mapping mode, such as a first mapping mode.

In another embodiment of the present disclosure, the physical resource configuration information may also include: a specific mapping range of the MPDCCH resource, such as the last 11 OFDM symbols.

At step 1303, the physical resource configuration information is sent to the MTC device through high-layer signaling.

In the present disclosure, the base station can send the physical resource configuration information to each MTC device in the DCI transmission region through high-layer signaling, such that each MTC device can accurately locate a target search region when blind detecting the DCI.

The high-layer signaling may include RRC (Radio Resource Control) signaling, and MAC (Medium Access Control) CE (Control Element) signaling.

In the embodiments of the present disclosure, for case 2 above, where the base station determines that each MTC device in the DCI transmission region supports searching for the DCI from the target resource region, the base station can autonomously decide which resource mapping mode to use for MPDCCH resource mapping based on a downlink channel condition of the cell; and after resource deployment, the base station can generate and send the physical resource configuration information to the MTC device, so that the MTC device can precisely locate the target search region according to the physical resource configuration information when blind detecting the DCI belonging to the MTC device itself, thereby improving detection efficiency of the DCI.

Approach 2: the base station determines which preset mapping mode is used to map the MPDCCH resource in the DCI transmission region according to a CCE (Control Channel Element) aggregation level.

In the present disclosure, a basic element used to carry the DCI of the MTC device may also be a CCE, and each CCE includes a preset number of REGs (Resource Element Groups). One PRB pair can support up to 4 CCEs, and a DCI bearer resource of one MTC device is scattered and mapped throughout the entire DCI transmission region. For example, if DCI of an MTC device such as UE 1 is loaded into CCEs in a centralized manner, the DCI may occupy two CCEs, that is, the DCI configured for UE 1 has a CCE aggregation level of 2. Although the DCI of the MTC device has the aggregation level of 2 CCEs, the DCI of UE 1 will be spread over the entire DCI transmission region during actual resource deployment.

Similar to PDCCH transmission in the LTE system, MPDCCH transmission also supports different CCE aggregation levels to match different channel qualities. And the same DCI transmission region can support different CCE aggregation levels in different coverage enhancement modes. As described above, in the present disclosure, the DCI transmission region that the base station can configure for the MTC device may include: 2 PRB pairs, 4 PRB pairs, and 6 PRB pairs. When the DCI transmission region configured by the base station for the MTC device is 6 PRB pairs, to improve resource utilization efficiency, the 6 PRB pairs can be divided into two mapping regions: a 2 PRB pair mapping region and a 4 PRB pairs mapping region. The CCE aggregation levels that can be supported by different DCI transmission regions are shown in Table 1.

TABLE 1

| DCI transmission region | | Supportable CCE aggregation level | |
|---|---|---|---|
| | | Coverage enhancement mode A | Coverage enhancement mode B |
| 2 PRB pairs | | 2, 4, 8 | 8 |
| 4 PRB pairs | | 2, 4, 8, 16 | 8, 16 |
| 6 PRB pairs | 2 PRB set | 2, 4, 8 | 8 |
| (2 PRB pairs + | 4 PRB set | 2, 4, 8, 16 | 16 |
| 4 PRB pairs) | 2 + 4 PRB | 24 | 24 |

Where, the 2 PRB set in Table 1 represents the 2 PRB pair mapping region included in the 6 PRB pair region; and similarly, the 4 PRB set in Table 1 represents the 4 PRB pairs mapping region included in the 6 PRB pair region.

It should be noted here that only when the DCI transmission region is 6 PRB pairs, the concept of the mapping region may be involved.

It can be seen that when the base station configures the CCE aggregation level for the DCI transmission region, the base station may configure one CCE aggregation level for the entire DCI transmission region, or the base station may configure different CCE aggregation levels for different mapping regions of the DCI transmission region, depending on the size of the transmission region.

Figure 6:
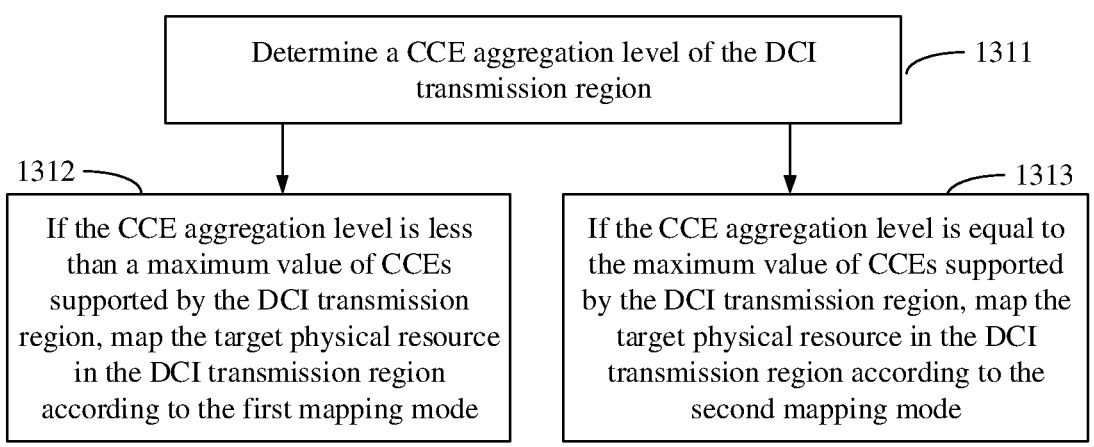
FIG. 6 is a flowchart illustrating another method of mapping a target physical resource in a DCI transmission region according to an embodiment of the present disclosure.

For a case where the base station configures one CCE aggregation level for the entire DCI transmission region, referring to FIG. 6, which is a flowchart illustrating another method of mapping a target physical resource in a DCI transmission region according to an embodiment, step 13 may include the followings.

At step 1311, a CCE aggregation level of the DCI transmission region is determined.

In the present disclosure, after determining the DCI transmission region, the base station can configure the CCE aggregation level corresponding to the DCI transmission region according to a downlink channel condition.

The rule for configuring the CCE aggregation level includes: if the downlink channel condition is good, a lower CCE aggregation level can be configured to avoid resource waste; and if the downlink channel condition is poor, a higher CCE aggregation level can be configured to ensure DCI transmission reliability.

Exemplarily, still taking the DCI transmission region as 2 PRB pairs as an example, if the base station detects that the current downlink channel condition is good, the CCE aggregation level can be configured to 2, as shown in Table 1 above. Conversely, if the base station detects that the current downlink channel condition is poor, the CCE aggregation level can be configured to 8, which is a maximum value of CCEs that can be supported by the two PRB pairs.

At step 1312, if the CCE aggregation level is less than a maximum value of CCEs supported by the DCI transmission region, the target physical resource is mapped in the DCI transmission region according to the first mapping mode.

Assuming that the CCE aggregation level configured by the base station for the DCI transmission region is expressed as $R_c$, in the present disclosure, $R_c$ can be compared with the maximum value of CCEs supported by the DCI transmission region, so as to determine which mapping mode is used by the base station to map the MPDCCH resource in the DCI transmission region.

If $R_c$ is less than the maximum value of CCEs supported by the DCI transmission region, the first mapping mode is used to perform the MPDCCH resource mapping. Otherwise, perform step 1313.

At step 1313, if the CCE aggregation level is equal to the maximum value of CCEs supported by the DCI transmission region, the target physical resource is mapped in the DCI transmission region according to the second mapping mode.

Similarly, if $R_c$ is equal to the maximum value of CCEs supported by the DCI transmission region, the second mapping mode is used to map the MPDCCH resource in the DCI transmission region.

Exemplarily, it is still assumed that the DCI transmission region determined by the base station is 2 PRB pairs, and as described above, in the present disclosure, one PRB pair can support up to 4 CCEs, and the maximum value of CCEs that can be supported by the 2 PRB pairs is 8.

If the CCR aggregation level $R_c$ configured by the base station for the two PRB pairs is less than 8, for example, $R_c$ is equal to 2 or 4, the base station maps the MPDCCH resource in the two PRB pairs according to the first mapping mode, as shown in FIG. 4-1.

Conversely, if the CCR aggregation level $R_c$ configured by the base station for the two PRB pairs is equal to 8, the base station maps the MPDCCH resource in the two PRB pairs according to the second mapping mode, as shown in FIG. 4-2. The base station will map the MPDCCH resource in a valid region of a subframe, where the valid region includes a time/frequency region corresponding to the first 3 OFDM symbols of the subframe, for example, a time/frequency region corresponding to each blank cell shown on the right side of FIG. 1.

Similarly, the above method is applicable to a case where the DCI transmission region is 4 PRB pairs. And the above method is applicable to a case where the DCI transmission region is 6 PRB pairs and Re is equal to 24, as shown in FIG. 4-3.

For a case where the base station configures different CCE aggregation levels for different mapping regions of the DCI transmission region, the base station may determine a MPDCCH resource mapping mode for each mapping region.

Figure 7:
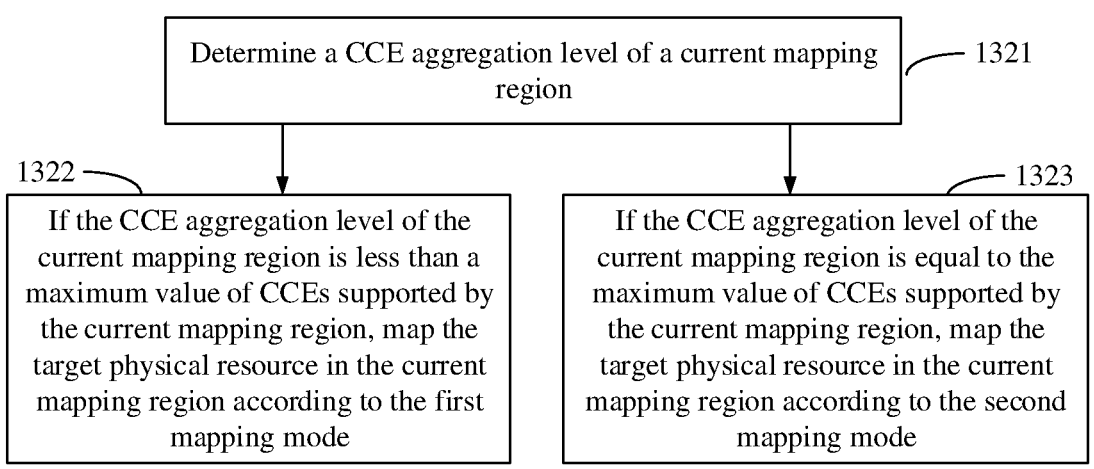
FIG. 7 is a flowchart illustrating another method of mapping a target physical resource in a DCI transmission region according to an embodiment of the present disclosure.

Referring to FIG. 7, which is a flowchart illustrating another method of mapping a target physical resource in a DCI transmission region according to an embodiment, step 13 may include the followings.

At step 1321, a CCE aggregation level of a current mapping region is determined.

At step 1322, if the CCE aggregation level of the current mapping region is less than a maximum value of CCEs supported by the current mapping region, the target physical resource is mapped in the current mapping region according to the first mapping mode.

At step 1323, if the CCE aggregation level of the current mapping region is equal to the maximum value of CCEs supported by the current mapping region, the target physical resource is mapped in the current mapping region according to the second mapping mode.

Figures 1, 8:
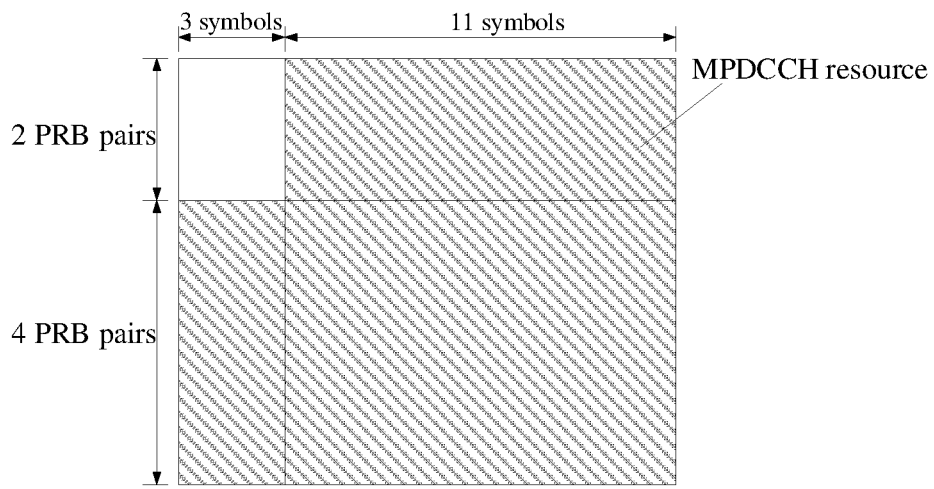
Figures 2, 8:
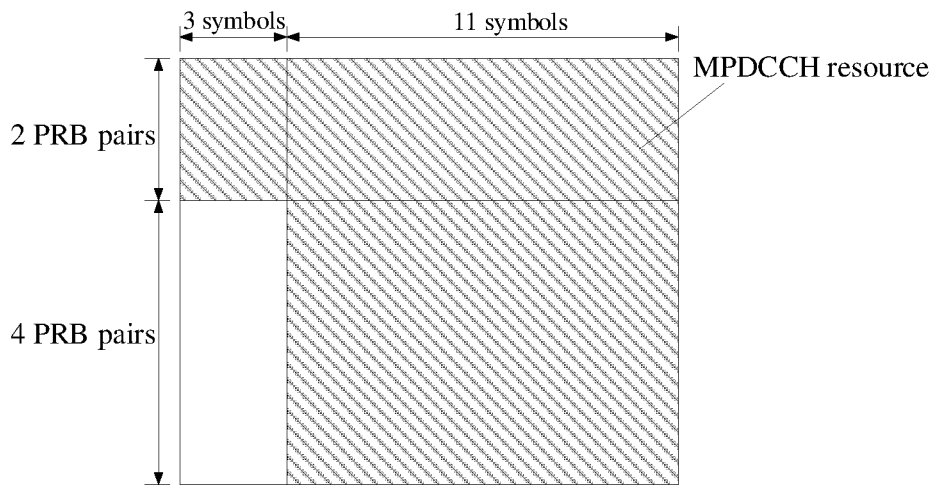
Figures 3, 8:
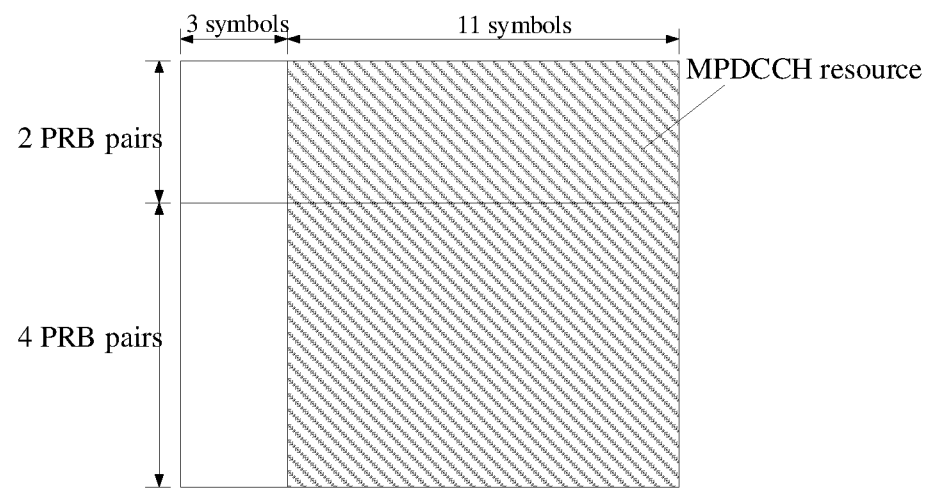
Figures 4, 8:
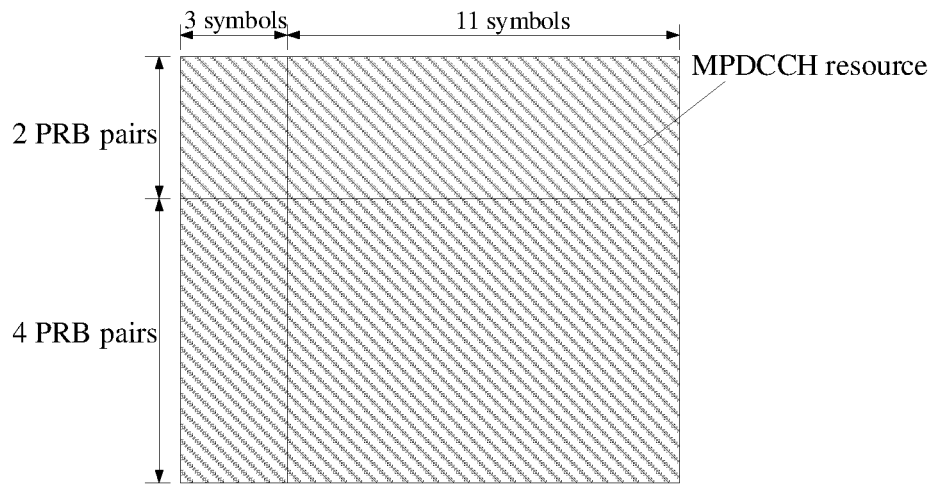

Exemplarily, for a case where the DCI transmission region is 6 PRB pairs and the 6 PRB pairs are divided into the 2 PRB pair mapping region and the 4 PRB pair mapping region, schematic diagrams illustrating deployment of the MPDCCH resource determined by the base station according to the above method can be seen in FIGS. 8-1 to 8-4.

FIG. 8-1 is applicable to an application scenario where $R_c$ of the 2 PRB pair mapping region is less than 8, and $R_c$ of the 4 PRB pair mapping region is equal to 16.

Similarly, FIG. 8-2 is applicable to an application scenario where the Re of the 2 PRB pair mapping region is equal to 8, and the $R_c$ of the 4 PRB pair mapping region is less than 16.

FIG. 8-3 is applicable to an application scenario where the $R_c$ of the 2 PRB pair mapping region is less than 8, and the $R_c$ of the 4 PRB pair mapping region is less than 16.

FIG. 8-4 is applicable to an application scenario where the $R_c$ of the 2 PRB pair mapping region is equal to 8, and the Re of the 4 PRB pair mapping region is equal to 16.

In the embodiments of the present disclosure, in the same DCI transmission region, different MPDCCH resource mapping modes may be used for different mapping regions. In this way, there is no need to notify the UE of a mapping mode of the target physical resource through high-layer signaling, and resource configuration is more flexible, which can effectively improve resource utilization efficiency.

At step 14, the DCI is transmitted to the MTC device through the target physical resource mapped in the DCI transmission region.

After the base station maps the target physical resource, the DCI can be loaded into the target physical resource, and the DCI can be sent to each MTC device through the MPDCCH.

In summary, using the method of transmitting MTC DCI provided by the present disclosure, when a base station independently deploys a physical downlink control channel resource for an MTC device, if the MTC device supports searching for its own DCI from a target resource region, that is, a control region of the original LTE system, the base station can map a target physical resource for carrying the DCI of the MTC device in the target resource region, thereby enhancing MPDCCH resource mapping, effectively using system resources, and improving transmission efficiency of the DCI of the MTC device.

Correspondingly, the present disclosure also provides a method of transmitting MTC DCI, which is applicable to a second MTC device, that is, an MTC device that supports searching for DCI from a target resource region. The target resource region is a control region of the original LTE system, which may be a time/frequency region corresponding to the first 3 OFDM symbols of a subframe, as shown in the left diagram of FIG. 1.

Figure 9:
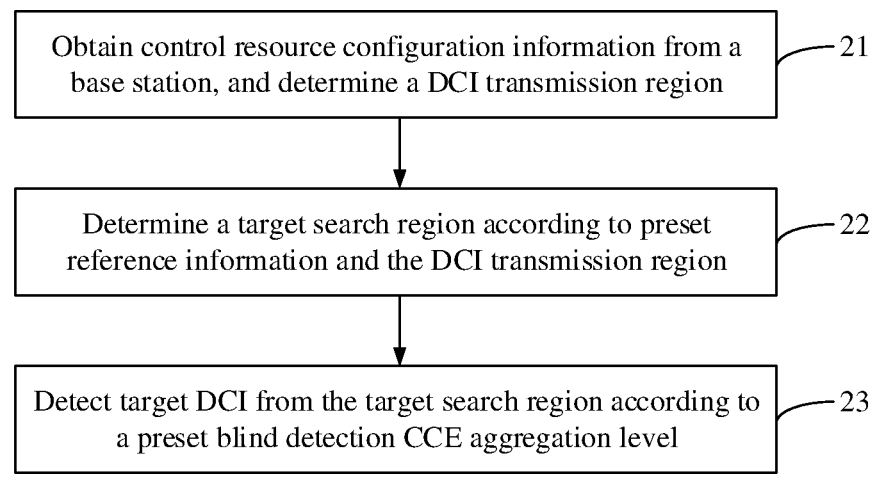
FIG. 9 is a flowchart illustrating a method of receiving and processing MTC DCI according to an embodiment of the present disclosure.

Referring to FIG. 9, which is a flowchart illustrating a method of receiving and processing MTC DCI according to an embodiment, the method may include the following steps.

At step 21, control resource configuration information from a base station is received, and a DCI transmission region is determined.

Corresponding to step 11 above, an MTC device receives the control resource configuration information sent by the base station to determine a time/frequency range in which to search for DCI configured the MTC device by the base station.

At step 22, a target search region is determined according to preset reference information and the DCI transmission region, where the preset reference information includes: a blind detection CCE aggregation level, or physical resource configuration information sent by the base station. The target search region may belong to a DCI transmission region or a mapping region of the DCI transmission region, which will be described in detail later in conjunction with specific examples.

In the present disclosure, according to whether the MTC device receives the physical resource configuration information from the base station, the implementation of step 22 may include the following two cases.

In a first case, the MTC device does not receive the physical resource configuration information from the base station, then the MTC device can determine the target search region according to a preset blind detection CCE aggregation level.

Figure 10:
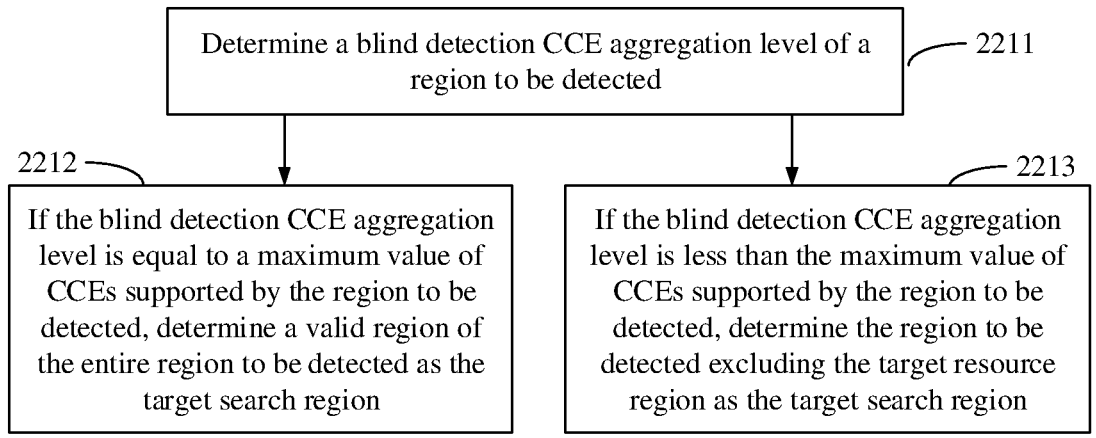
FIG. 10 is a flowchart illustrating a method of determining a target search region according to an embodiment of the present disclosure.

Referring to FIG. 10, which is a flowchart illustrating a method of determining a target search region in according to an embodiment, step 22 may include the followings.

At step 2211, a blind detection CCE aggregation level of a region to be detected is determined, where the region to be detected includes: the DCI transmission region, or a mapping region of the DCI transmission region.

When the MTC device performs blind detection, the MTC device generally does not know which CCE aggregation level is used to search for its own DCI from the DCI transmission region. Therefore, the available CCE aggregation levels are used to search separately. Still taking the DCI transmission region as 2 PRB pairs as an example, the preset blind detection CCE aggregation level of the MTC device can be 2, 4, and 8.

At step 2212, if the blind detection CCE aggregation level is equal to a maximum value of CCEs supported by the region to be detected, a valid region of the entire region to be detected is determined as the target search region.

The valid region is a region of the entire region to be detected excluding a CRS resource.

In the present disclosure, the region to be detected may be the entire DCI transmission region. The region to be detected may also be a mapping region in a DCI transmission region.

Exemplarily, it is still assumed that the region to be detected is 2 PRB pairs, and if a value of a blind detection CCE aggregation level of UE 1 is 8, then the target search region determined by UE 1 is shown in FIG. 4-2.

If the DCI transmission region is 6 PRB pairs including two mapping regions, which are a 2 PRB pair mapping region and a 4 PRB pair mapping region respectively. If the region to be detected is the 2 PRB pair mapping region, when UE 1 determines to search the mapping region with a value of the CCE aggregation level as 8, the determined target search region is shown in FIG. 8-2.

At step 2213, if the blind detection CCE aggregation level is less than the maximum value of CCEs supported by the region to be detected, the region to be detected excluding the target resource region is determined as the target search region.

Similarly, if the value of the blind detection CCE aggregation level of UE 1 is 2 or 4, which is smaller than the maximum value (8) of CCEs supported by the region to be detected (i.e., 2 PRB pairs), the target search region determined by UE 1 is shown in FIG. 4-1.

For a case where the region to be detected is the 2 PRB pair mapping region, if the value of the blind detection CCE aggregation level of UE 1 is 2 or 4, which is smaller than the maximum value (8) of CCEs supported by the region to be detected (i.e., 2 PRB pair mapping region), the target search region determined by UE 1 is shown in FIG. 8-1.

In a second case, the MTC device receives the physical resource configuration information from the base station, then the MTC device can determine the target search region according to the physical resource configuration information. The physical resource configuration information informs the MTC device about a mapping range of an MPDCCH resource.

In an embodiment, if the physical resource configuration information includes the mapping range of the MPDCCH resource, the MTC device can directly determine the mapping range of the MPDCCH resource as the target search region.

In another embodiment, the physical resource configuration information may include a preset mapping mode of the DCI transmission region.

Figure 11:
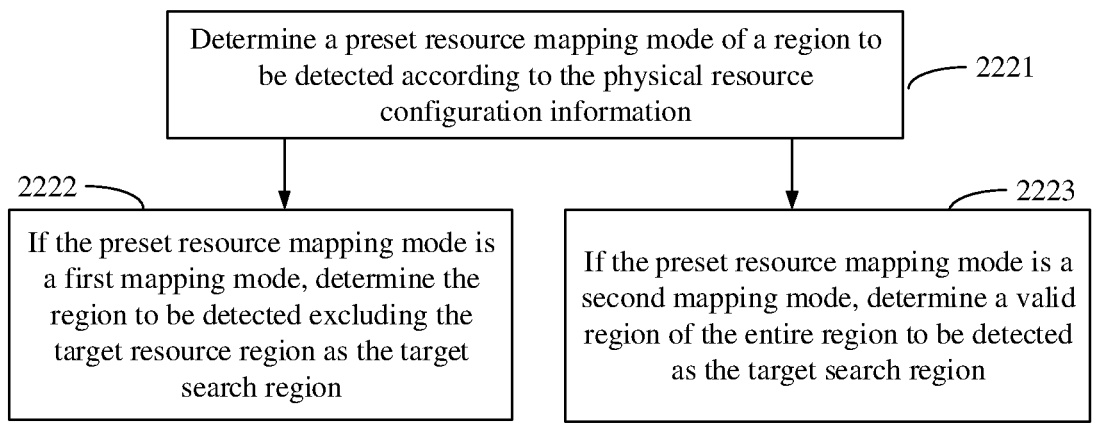
FIG. 11 is a flowchart illustrating another method of determining a target search region according to an embodiment of the present disclosure.

Referring to FIG. 11, which is a flowchart illustrating another method of determining a target search region according to an embodiment, step 22 may include the followings.

At step 2221, a preset resource mapping mode of a region to be detected is determined according to the physical resource configuration information, where the region to be detected includes: the DCI transmission region, or a mapping region of the DCI transmission region.

At step 2222, if the preset resource mapping mode is a first mapping mode, the region to be detected excluding the target resource region is determined as the target search region, where the first mapping mode is configured to map a target physical resource in a data region of an original LTE system, and the target physical resource carries the DCI of the MTC device.

At step 2223, if the preset resource mapping mode is a second mapping mode, a valid region of the entire region to be detected is determined as the target search region, where the valid region is a region of the entire region to be detected excluding a CRS resource, the second mapping mode is configured to map the target physical resource in a valid region of a subframe, and the valid region of the subframe is a time/frequency region excluding a CRS resource in the subframe.

At step 23, target DCI is detected from the target search region according to a preset blind detection CCE aggregation level.

As shown in Table 1 above, after determining the target search region, the MTC device detects its own DCI, that is, the target DCI, from the target search region according to available blind detection CCE aggregation level.

Figure 12:
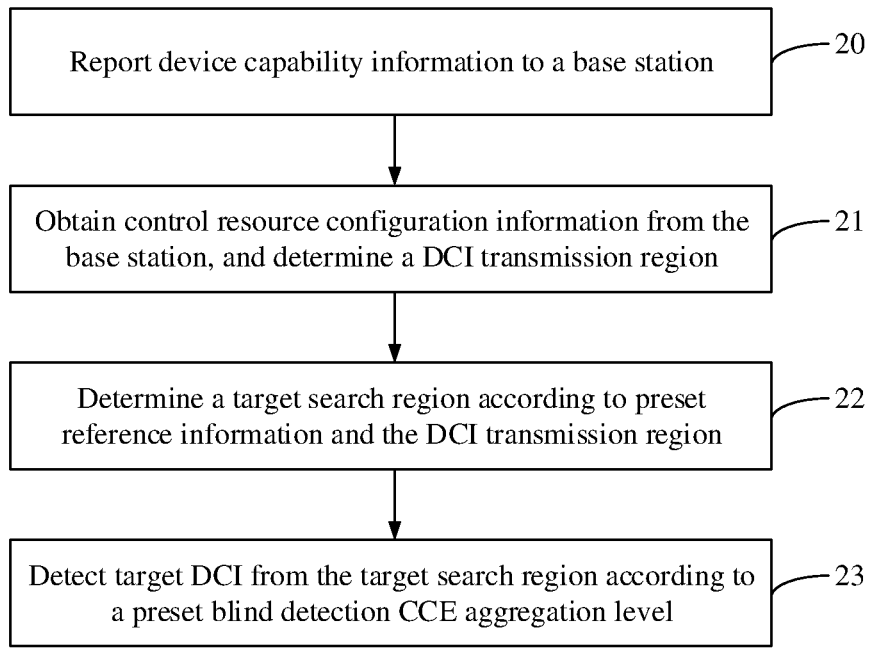
FIG. 12 is a flowchart illustrating another method of receiving and processing MTC DCI according to an embodiment of the present disclosure.

Corresponding to the embodiment shown in FIG. 3, referring to FIG. 12, which is a flowchart illustrating another method of receiving and processing MTC DCI according to an embodiment, before step 22, the method may further include the following.

At step 20, device capability information is reported to the base station, where the device capability information indicates whether the MTC device has an ability to search for the DCI from the target resource region.

Correspondingly, after obtaining the device capability information, the base station may map the target physical resource for carrying the MTC DCI in a preset DCI transmission region according to the device capability information.

For the foregoing method embodiments, for the sake of simplicity, all of them are described as a series of combinations of actions, but those skilled in the art should know that the present disclosure is not limited by the described sequence of actions, because some steps may be performed in other orders or simultaneously according to the present disclosure.

Secondly, those skilled in the art should also know that the embodiments described in the description all belong to optional embodiments, and the operations and modules involved are not necessarily required in the present disclosure.

Corresponding to the foregoing method embodiments for implementing an application function, the present disclosure further provides embodiments of apparatuses for implementing the application function and corresponding terminals.

Figure 13:
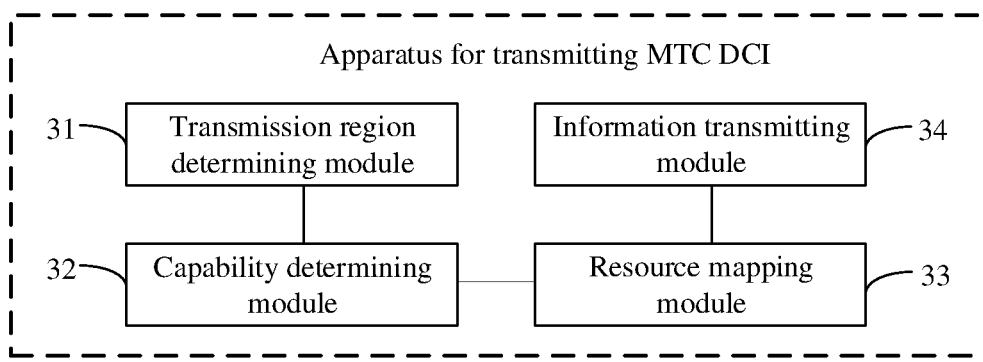
FIG. 13 is a block diagram illustrating an apparatus for transmitting MTC DCI according to an embodiment of the present disclosure.

Referring to FIG. 13, which is a block diagram illustrating an apparatus for transmitting MTC DCI according to an embodiment, the apparatus can be set in a base station, and the apparatus may include the followings.

A transmission region determining module 31 is configured to determine a DCI transmission region configured for an MTC device, generate and send control resource configuration information to the MTC device.

A capability determining module 32 is configured to determine an information detection capability of the MTC device in the DCI transmission region, where the information detection capability indicates whether the MTC device supports searching for DCI from a target resource region, and the target resource region is a control region of an original LTE system. In an apparatus embodiment of the present disclosure, the control region may include: a time/frequency region corresponding to the first 3 OFDM symbols of a subframe.

A resource mapping module 33 is configured to map a target physical resource in the DCI transmission region according to the information detection capability and a preset resource mapping mode, where the target physical resource carries the DCI of the MTC device.

In the present disclosure, the preset resource mapping mode may include:
  a first mapping mode configured to map the target physical resource in a data region of the original LTE system; and/or
  a second mapping mode configured to map the target physical resource in a valid region of a subframe, where the valid region of the subframe is a time/frequency region excluding a cell reference signal resource in the subframe. The data region may include: a time/frequency region corresponding to last 11 OFDM symbols of a subframe.

An information transmitting module 34 is configured to transmit the DCI to the MTC device through the target physical resource mapped in the DCI transmission region.

Figure 14:
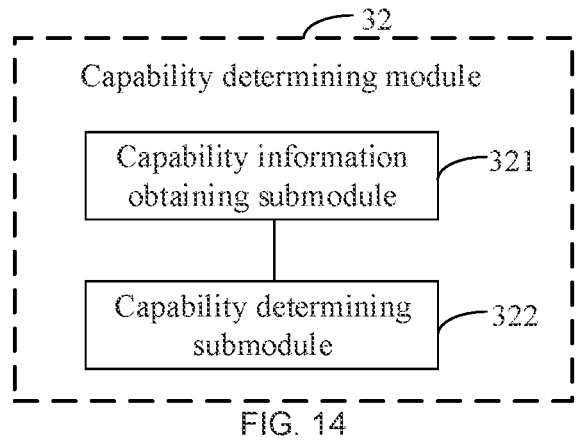
FIG. 14 is a block diagram illustrating a capability determining module according to an embodiment of the present disclosure.

Referring to FIG. 14, which is a block diagram illustrating a capability determining module according to an embodiment, on the basis of the apparatus embodiment shown in FIG. 13, the capability determining module 32 may include:
  a capability information obtaining submodule 321 configured to obtain device capability information reported by each MTC device; and
  a capability determining submodule 322 configured to determine the information detection capability of the MTC device according to the device capability information.

In an apparatus embodiment of the present disclosure, the device capability information obtained by the capability information obtaining submodule 321 may include: a preset indication value for indicating the information detection capability.

Figure 15:
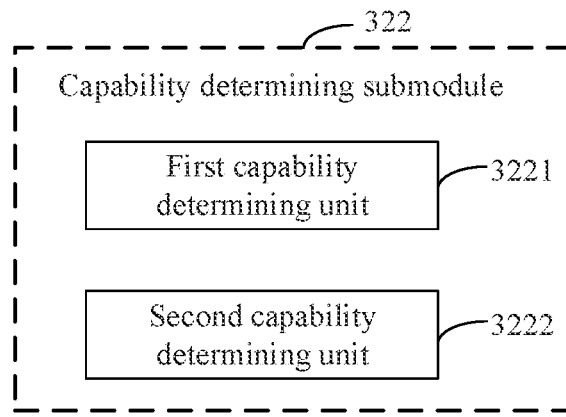
FIG. 15 is a block diagram illustrating a capability determining submodule according to an embodiment of the present disclosure.

Referring to FIG. 15, which is a block diagram illustrating a capability determining submodule according to an embodiment, on the basis of the apparatus embodiment shown in FIG. 14, the capability determining submodule 322 may include:
- a first capability determining unit 3221 configured to determine that the MTC device supports searching for the DCI from the target resource region in a case where the preset indication value is a first indication value; and
- a second capability determining unit 3222 configured to determine that the MTC device does not support searching for the DCI from the target resource region in a case where the preset indication value is a second indication value.

In an apparatus embodiment of the present disclosure, the resource mapping module 33 may be configured to, in a case where the MTC device does not support searching for the DCI from the target resource region, map the target physical resource in the DCI transmission region according to the first mapping mode.

Figure 16:
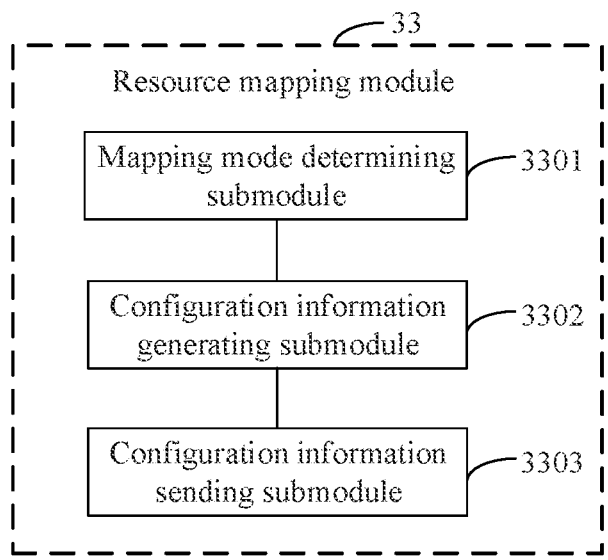
FIG. 16 is a block diagram illustrating a resource mapping module according to an embodiment of the present disclosure.

Referring to FIG. 16, which is a block diagram illustrating a resource mapping module according to an embodiment, on the basis of the apparatus embodiment shown in FIG. 13, the resource mapping module 33 may include:
- a mapping mode determining submodule 3301 configured to determine a target resource mapping mode of the target physical resource, and perform resource mapping, where the target resource mapping mode is the first mapping mode or the second mapping mode;
- a configuration information generating submodule 3302 configured to generate physical resource configuration information according to the target resource mapping mode, where the physical resource configuration information informs the MTC device about a mapping range of the target physical resource; and
- a configuration information sending submodule 3303 configured to send the physical resource configuration information to the MTC device through high-layer signaling.

In another apparatus embodiment of the present disclosure, the resource mapping module 33 may be configured to map the target physical resource in the DCI transmission region according to a CCE aggregation level in a case where the MTC device supports searching for the DCI from the target resource region.

Figure 17:
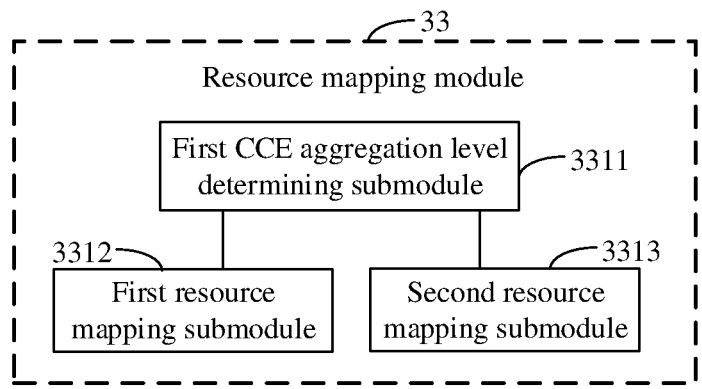
FIG. 17 is a block diagram illustrating another resource mapping module according to an embodiment of the present disclosure.

Referring to FIG. 17, which is a block diagram illustrating another resource mapping module according to an embodiment, on the basis of the apparatus embodiment shown in FIG. 13, the resource mapping module 33 may include:
- a first CCE aggregation level determining submodule 3311 configured to determine a CCE aggregation level of the DCI transmission region;
- a first resource mapping submodule 3312 configured to map the target physical resource in the DCI transmission region according to the first mapping mode in a case where the CCE aggregation level is less than a maximum value of CCEs supported by the DCI transmission region; and
- a second resource mapping submodule 3313 configured to map the target physical resource in the DCI transmission region according to the second mapping mode in a case where the CCE aggregation level is equal to the maximum value of CCEs supported by the DCI transmission region.

In another apparatus embodiment of the present disclosure, the DCI transmission region determined by the transmission region determining module 31 may include: mapping regions of different sizes.

Figure 18:
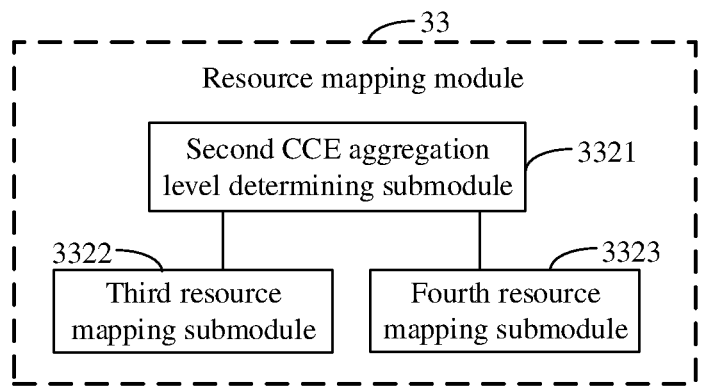
FIG. 18 is a block diagram illustrating another resource mapping module according to an embodiment of the present disclosure.

Correspondingly, referring to FIG. 18, which is a block diagram illustrating another resource mapping module according to an embodiment, on the basis of the apparatus embodiment shown in FIG. 13, the resource mapping module 33 may include:
- a second CCE aggregation level determining submodule 3321 configured to determine a CCE aggregation level of a current mapping region;
- a third resource mapping submodule 3322 configured to map the target physical resource in the current mapping region according to the first mapping mode in a case where the CCE aggregation level of the current mapping region is less than a maximum value of CCEs supported by the current mapping region; and
- a fourth resource mapping submodule 3323 configured to map the target physical resource in the current mapping region according to the second mapping mode in a case where the CCE aggregation level of the current mapping region is equal to the maximum value of CCEs supported by the current mapping region.

Correspondingly, the present disclosure also provides apparatuses for transmitting MTC DCI, the apparatus can be set in an MTC device. The MTC device supports searching for DCI from a target resource region, the target resource region is a control region of an original LTE system.

Figure 19:
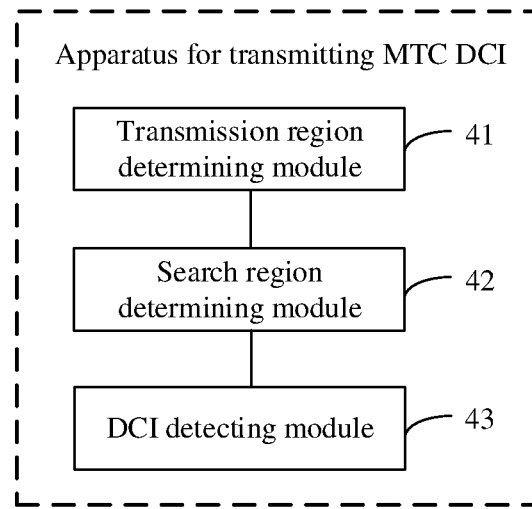
FIG. 19 is a block diagram illustrating an apparatus for transmitting MTC DCI according to an embodiment of the present disclosure.

Referring to FIG. 19, which is a block diagram illustrating an apparatus for transmitting MTC DCI according to an embodiment, the apparatus may include the followings.

A transmission region determining module 41 is configured to obtain control resource configuration information from a base station, and determine a DCI transmission region.

A search region determining module 42 is configured to determine a target search region according to preset reference information and the DCI transmission region, where the preset reference information includes a blind detection CCE aggregation level or physical resource configuration information sent by the base station.

A DCI detecting module 43 is configured to detect target DCI from the target search region according to a preset blind detection CCE aggregation level.

Figure 20:
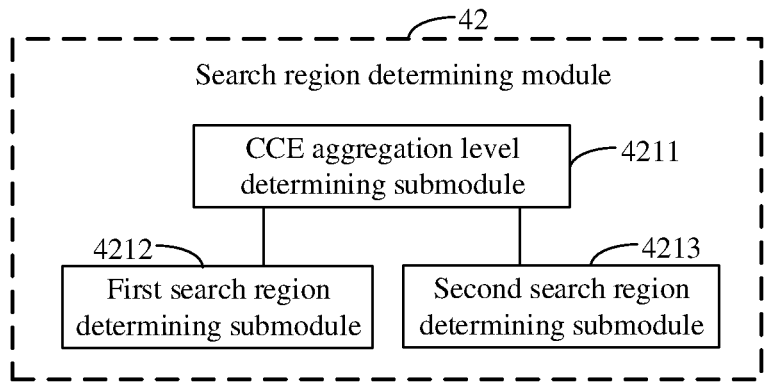
FIG. 20 is a block diagram illustrating a search region determining module according to an embodiment of the present disclosure.

In an apparatus embodiment of the present disclosure, if the preset reference information includes: the blind detection CCE aggregation level, referring to FIG. 20, which is a block diagram illustrating a search region determining module according to an embodiment, on the basis of the apparatus embodiment shown in FIG. 19, the search region determining module 42 may include:
- a CCE aggregation level determining submodule 4211 configured to determine a blind detection CCE aggregation level of a region to be detected, where the region to be detected includes the DCI transmission region or a mapping region of the DCI transmission region; a first search region determining submodule 4212 configured to determine a valid region of the entire region to be detected as the target search region in a case where the blind detection CCE aggregation level is equal to a maximum value of CCEs supported by the region to be detected, where the valid region is a region of the entire region to be detected excluding a CRS resource; and
- a second search region determining submodule 4213 configured to determine the region to be detected excluding the target resource region as the target search region in a case where the blind detection CCE aggregation level is less than the maximum value of CCEs supported by the region to be detected.

Figure 21:
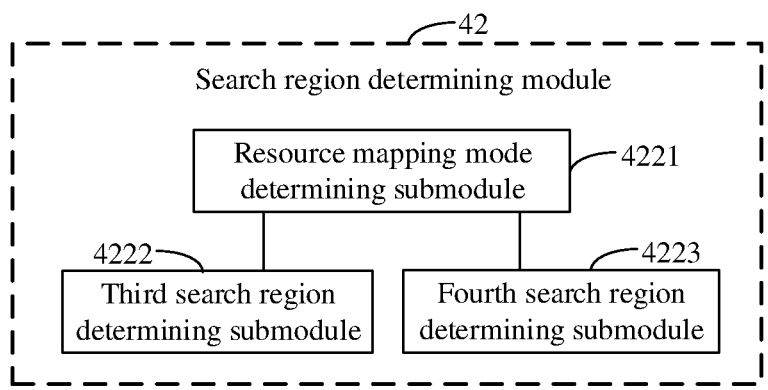
FIG. 21 is a block diagram illustrating another search region determining module according to an embodiment of the present disclosure.

In an apparatus embodiment of the present disclosure, if the preset reference information includes: the physical resource configuration information sent by the base station, referring to FIG. 21, which is a block diagram illustrating another search region determining module according to an embodiment, on the basis of the apparatus embodiment shown in FIG. 19, the search region determining module 42 may include:

- a resource mapping mode determining submodule 4221 configured to determine a preset resource mapping mode of a region to be detected according to the physical resource configuration information, where the region to be detected includes the DCI transmission region or a mapping region of the DCI transmission region;
- a third search region determining submodule 4222 configured to determine the region to be detected excluding the target resource region as the target search region in a case where the preset resource mapping mode is a first mapping mode; and
- a fourth search region determining submodule 4223 configured to determine a valid region of the entire region to be detected as the target search region in a case where the preset resource mapping mode is a second mapping mode, where the valid region is a region of the region to be detected excluding a CRS resource.

The first mapping mode is configured to map a target physical resource in a data region of the original LTE system, and the target physical resource carries the DCI of the MTC device.

The second mapping mode is configured to map the target physical resource in a valid region of a subframe, and the valid region of the subframe is a time/frequency region excluding a CRS resource in the subframe.

Figure 22:
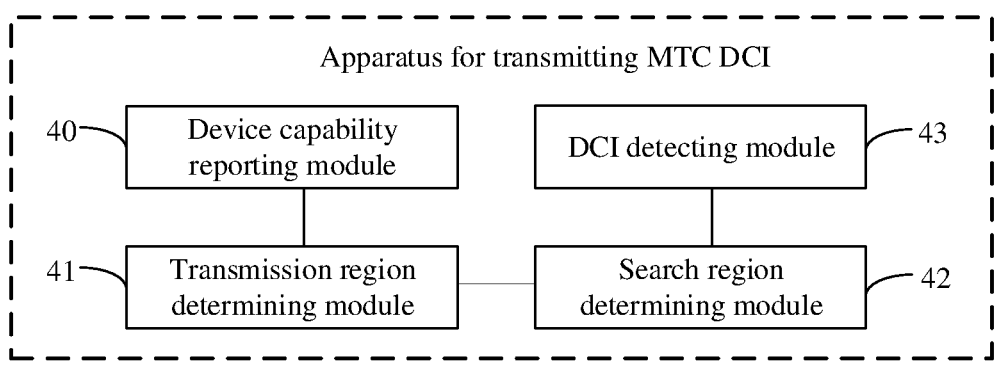
FIG. 22 is a block diagram illustrating another apparatus for transmitting MTC DCI according to an embodiment of the present disclosure.

Referring to FIG. 22, which is a block diagram illustrating another apparatus for transmitting MTC DCI according to an embodiment, on the basis of the apparatus embodiment shown in FIG. 19, the apparatus may further include:

- a device capability reporting module 40 configured to report device capability information to the base station, where the device capability information indicates whether the MTC device has an ability to search for the DCI from the target resource region, such that the base station maps a target physical resource for carrying the MTC DCI in a preset DCI transmission region according to the device capability information.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, e.g., may be located in one place, or may be distributed to a plurality of network units. Part or all of the modules may be selected according to actual requirements to implement the objectives of the solutions in the examples. Those of ordinary skill in the art may understand and carry out them without creative work.

Correspondingly, a base station is provided on the one hand, including:

- a processor, and
- a memory for storing instructions executable by the processor, where the processor is configured to:

determine a DCI transmission region configured for an MTC device, generate and send control resource configuration information to the MTC device;

determine an information detection capability of the MTC device in the DCI transmission region, where the information detection capability indicates whether the MTC device supports searching for DCI from a target resource region, and the target resource region is a control region of an original LTE system;

map a target physical resource in the DCI transmission region according to the information detection capability and a preset resource mapping mode, where the target physical resource carries the DCI of the MTC device; and transmit the DCI to the MTC device through the target physical resource mapped in the DCI transmission region. On the other hand, user equipment is provided, the user equipment belongs to an MTC device, and the MTC device supports searching for DCI from a target resource region, the target resource region is a control region of an original LTE system, and the user equipment includes:

- a processor, and
- a memory for storing instructions executable by the processor, where the processor is configured to:

obtain control resource configuration information from a base station, and determining a DCI transmission region;

determine a target search region according to preset reference information and the DCI transmission region, where the preset reference information includes a blind detection CCE aggregation level or physical resource configuration information sent by the base station; and detect target DCI from the target search region according to a preset blind detection CCE aggregation level.

Figure 23:
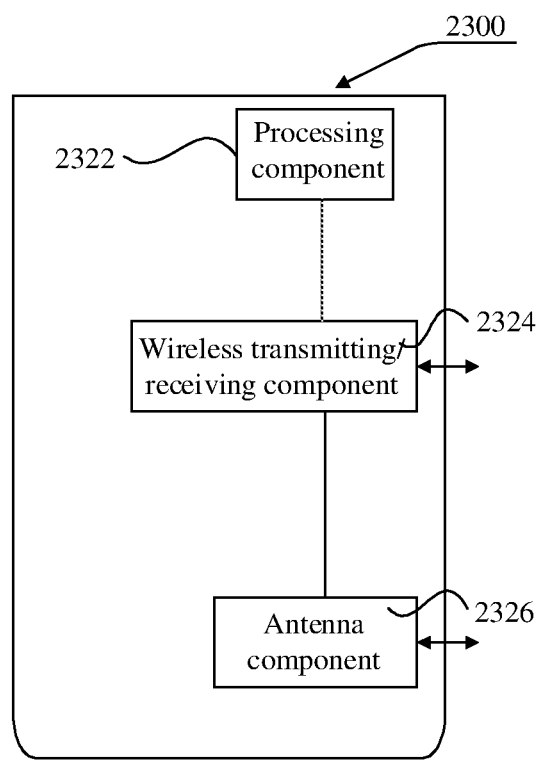
FIG. 23 is a schematic structural diagram illustrating a base station according to an embodiment of the present disclosure.

As shown in FIG. 23, which is a schematic structural diagram of a base station 2300 according to an embodiment. Referring to FIG. 23, the base station 2300 includes a processing component 2322, a wireless transmitting/receiving component 2324, an antenna component 2326, and a signal processing component specific to a wireless interface. The processing component 2322 may further include one or more processors.

One of the processors in the processing component 2322 may be configured to:

determine a DCI transmission region configured for an MTC device, generate and send control resource configuration information to the MTC device;

determine an information detection capability of the MTC device in the DCI transmission region, where the information detection capability indicates whether the MTC device supports searching for DCI from a target resource region, and the target resource region is a control region of an original LTE system;

map a target physical resource in the DCI transmission region according to the information detection capability and a preset resource mapping mode, where the target physical resource carries the DCI of the MTC device; and transmit the DCI to the MTC device through the target physical resource mapped in the DCI transmission region.

In embodiments, a non-transitory computer-readable storage medium is provided, the storage medium includes and stores computer instructions. The computer instructions may be executed by the processing component 2322 of the base station 2300 to complete the method of transmitting MTC DCI as described in any of FIGS. 1 to 8-4. For example, the non-transitory computer readable storage medium may be a ROM, a random access memory (RAM), a CD-ROM, a magnetic tape, a floppy disk, and an optical data storage device.

Figure 24:
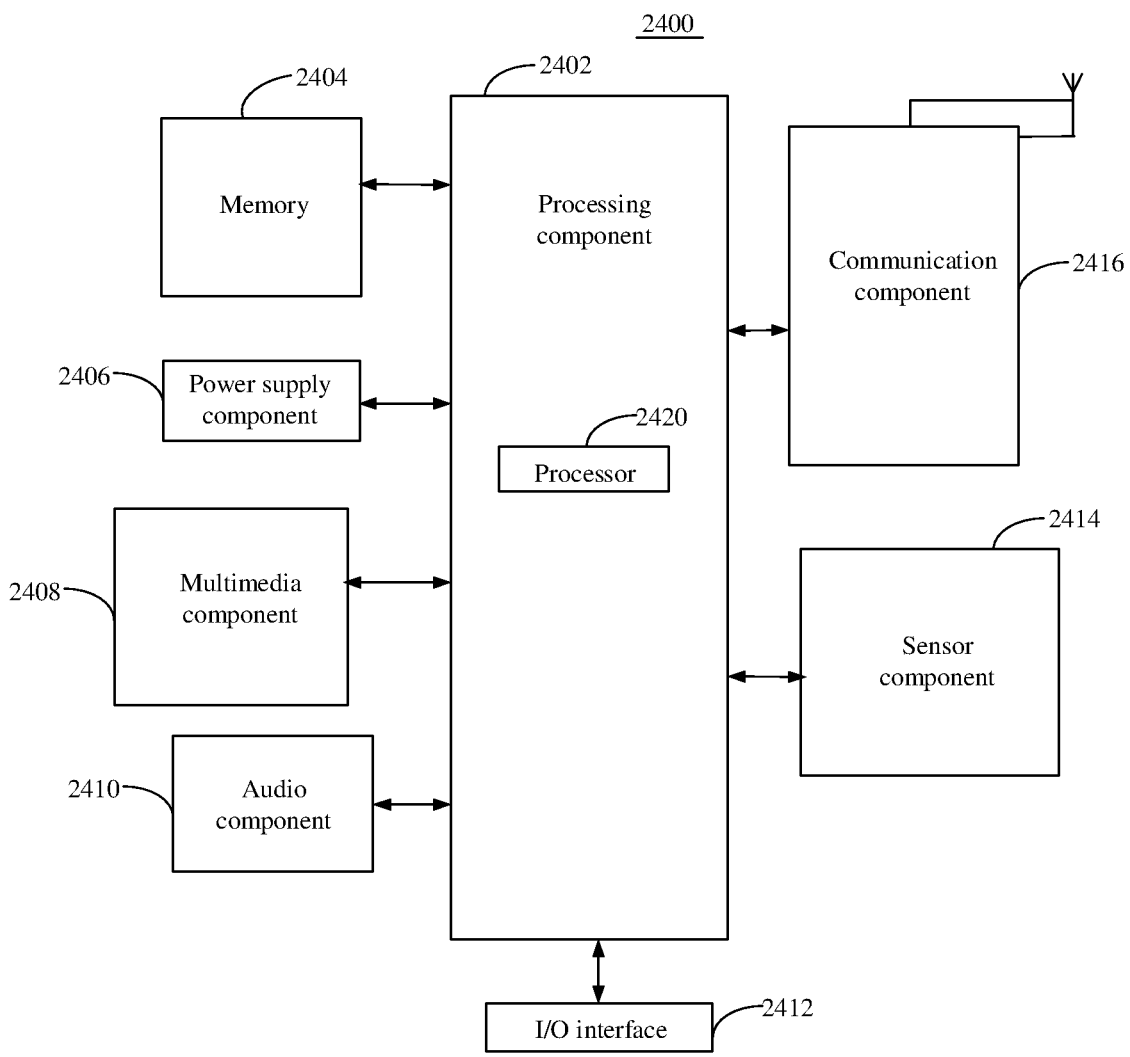
FIG. 24 is a schematic structural diagram illustrating user equipment according to an embodiment of the present disclosure.

FIG. 24 is a schematic structural diagram of user equipment 2400 according to an embodiment. For example, the user equipment 2400 may be a terminal that supports MTC services, and may specifically be a mobile phone, a computer, a digital broadcasting terminal, a message receiving and sending device, a game console, a tablet device, a medical device, a fitness device, a personal digital assistant, a smart instrument, a smart vehicle such as a shared bicycle, etc., a wearable device such as a smart watch, a smart glass, a smart band, a smart running shoe and so on.

Referring to FIG. 24, the user equipment 2400 may include one or more of the following components: a processing component 2402, a memory 2404, a power supply component 2406, a multimedia component 2408, an audio component 2410, an input/output (I/O) interface 2412, a sensor component 2414, and a communication component 2416.

The processing component 2402 generally controls overall operations of the user equipment 2400, such as operations associated with display, phone calls, data communications, camera operations, and recording operations. The processing component 2402 may include one or more processors 2420 to execute instructions to complete all or part of the steps of the above methods. In addition, the processing component 2402 may include one or more modules which facilitate the interaction between the processing component 2402 and other components. For example, the processing component 2402 may include a multimedia module to facilitate the interaction between the multimedia component 2408 and the processing component 2402.

The memory 2404 is to store various types of data to support the operation of the user equipment 2400. Examples of such data include instructions for any application or method operated on the user equipment 2400, contact data, phonebook data, messages, pictures, videos, and so on. The memory 2404 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 2406 provides power to different components of the user equipment 2400. The power supply component 2406 may include a power management system, one or more power supplies, and other components associated with generating, managing, and distributing power for the user equipment 2400.

The multimedia component 2408 includes a screen providing an output interface between the user equipment 2400 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 2408 may include a front camera and/or a rear camera. The front camera and/or rear camera may receive external multimedia data when the equipment 2400 is in an operating mode, such as a photographing mode or a video mode. Each of the front camera and the rear camera may be a fixed optical lens system or have focal length and optical zooming capability.

The audio component 2410 is to output and/or input an audio signal. For example, the audio component 2410 includes a microphone (MIC). When the user equipment 2400 is in an operating mode, such as a call mode, a recording mode, and a voice recognition mode, the MIC is to receive an external audio signal. The received audio signal may be further stored in the memory 2404 or sent via the communication component 2416. In some examples, the audio component 2410 further includes a speaker to output an audio signal.

The I/O interface 2412 may provide an interface between the processing component 2402 and peripheral interface modules. The above peripheral interface modules may include a keyboard, a click wheel, buttons and so on. These buttons may include, but are not limited to, a home button, a volume button, a starting button and a locking button.

The sensor component 2414 includes one or more sensors to provide status assessments of various aspects for the user equipment 2400. For example, the sensor component 2414 may detect the on/off status of the equipment 2400, and relative positioning of component, for example, the component is a display and a keypad of the user equipment 2400. The sensor component 2414 may also detect a change in position of the user equipment 2400 or a component of the user equipment 2400, a presence or absence of the contact between a user and the user equipment 2400, an orientation or an acceleration/deceleration of the user equipment 2400, and a change in temperature of the user equipment 2400. The sensor component 2414 may include a proximity sensor to detect the presence of a nearby object without any physical contact. The sensor component 2414 may further include an optical sensor, such as a Complementary Metal-Oxide-Semiconductor (CMOS) or Charged Coupled Device (CCD) image sensor which is used in imaging applications. In some examples, the sensor component 2414 may further include an acceleration sensor, a gyroscope sensor, a magnetic sensor, a pressure sensor, or a temperature sensor.

The communication component 2416 is to facilitate wired or wireless communication between the user equipment 2400 and other devices. The user equipment 2400 may access a wireless network that is based on a communication standard, such as Wi-Fi, 2G, 3G, 4G LTE, 5G NR, or a combination thereof. In an example, the communication component 2416 receives a broadcast signal or broadcast-associated information from an external broadcast management system via a broadcast channel. In an example, the communication component 2416 further includes a Near Field Communication (NFC) module to facilitate short-range communications. For example, the NFC module may be implemented based on a Radio Frequency Identification (RFID) technology, an Infrared Data Association (IrDA) technology, an Ultra Wideband (UWB) technology, a Bluetooth® (BT) technology and other technologies.

In an example, the user equipment 2400 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In an example, a non-transitory machine-readable storage medium including instructions is provided, such as a memory 2404 including instructions. The instructions may be executed by the processor 2420 of the user equipment 2400 to complete the method of transmitting MTC DCI as described in any of FIGS. 9 to 12. For example, the non-transitory machine-readable storage medium may be a ROM, a RAM, a CD-ROM, a magnetic tape, a floppy disk, an optical data storage device, and so on.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A method of transmitting machine type communication (MTC) downlink control information (DCI), being applicable to a base station, comprising:
   determining a DCI transmission region configured for an MTC device;
   generating and sending control resource configuration information to the MTC device;
   determining an information detection capability of the MTC device in the DCI transmission region, wherein the information detection capability indicates whether the MTC device supports searching for DCI from a target resource region, and the target resource region is a control region of an original long term evolution (LTE) system;
   mapping a target physical resource in the DCI transmission region according to the information detection capability and a preset resource mapping mode, wherein the target physical resource carries the DCI of the MTC device; and
   transmitting the DCI to the MTC device through the target physical resource mapped in the DCI transmission region.

2. The method according to claim 1, wherein the control region comprises:
   a time/frequency region corresponding to first 3 orthogonal frequency division multiplexing (OFDM) symbols of a subframe.

3. The method according to claim 1, wherein the preset resource mapping mode comprises at least one of:
   a first mapping mode configured to map the target physical resource in a data region of the original LTE system; or
   a second mapping mode configured to map the target physical resource in a valid region of a subframe, wherein the valid region of the subframe is a time/frequency region excluding a cell reference signal resource in the subframe.

4. The method according to claim 3, wherein the data region comprises:
   a time/frequency region corresponding to last 11 OFDM symbols of a subframe.

5. The method according to claim 3, wherein mapping the target physical resource in the DCI transmission region according to the information detection capability and the preset resource mapping mode comprises:
   in response to that the MTC device does not support searching for the DCI from the target resource region, mapping the target physical resource in the DCI transmission region according to the first mapping mode.

6. The method according to claim 3, wherein mapping the target physical resource in the DCI transmission region according to the information detection capability and the preset resource mapping mode comprises:
   determining a target resource mapping mode of the target physical resource, and performing resource mapping, wherein the target resource mapping mode is the first mapping mode or the second mapping mode;
   generating physical resource configuration information according to the target resource mapping mode, wherein the physical resource configuration information informs the MTC device about a mapping range of the target physical resource; and
   sending the physical resource configuration information to the MTC device through high-layer signaling.

7. The method according to claim 3, wherein mapping the target physical resource in the DCI transmission region according to the information detection capability and the preset resource mapping mode comprises:
   in response to that the MTC device supports searching for the DCI from the target resource region, mapping the target physical resource in the DCI transmission region according to a control channel element (CCE) aggregation level.

8. The method according to claim 7, wherein mapping the target physical resource in the DCI transmission region according to the CCE aggregation level comprises:
   determining a CCE aggregation level of the DCI transmission region;
   in response to that the CCE aggregation level is less than a maximum value of CCEs supported by the DCI transmission region, mapping the target physical resource in the DCI transmission region according to the first mapping mode; and
   in response to that the CCE aggregation level is equal to the maximum value of CCEs supported by the DCI transmission region, mapping the target physical resource in the DCI transmission region according to the second mapping mode.

9. The method according to claim 7,
   wherein the DCI transmission region comprises:
      mapping regions of different sizes; and
   wherein mapping the target physical resource in the DCI transmission region according to the CCE aggregation level comprises:
      determining a CCE aggregation level of a current mapping region;
      in response to that the CCE aggregation level of the current mapping region is less than a maximum value of CCEs supported by the current mapping region, mapping the target physical resource in the current mapping region according to the first mapping mode; and
      in response to that the CCE aggregation level of the current mapping region is equal to the maximum value of CCEs supported by the current mapping region, mapping the target physical resource in the current mapping region according to the second mapping mode.

10. The method according to claim 1, wherein determining the information detection capability of the MTC device in the DCI transmission region comprises:

obtaining device capability information reported by each MTC device; and determining the information detection capability of the MTC device according to the device capability information.

11. The method according to claim 10, wherein the device capability information comprises:
a preset indication value for indicating the information detection capability; and wherein determining the information detection capability of the MTC device according to the device capability information comprises:
in response to that the preset indication value is a first indication value, determining that the MTC device supports searching for the DCI from the target resource region; and
in response to that the preset indication value is a second indication value, determining that the MTC device does not support searching for the DCI from the target resource region.

12. A base station, comprising:
a processor, and
a memory for storing instructions executable by the processor,
wherein the processor is configured to perform the method according to claim 1.

13. A method of receiving and processing machine type communication (MTC) downlink control information (DCI), being applicable to an MTC device, the MTC device supporting searching for DCI from a target resource region, the target resource region being a control region of an original long term evolution (LTE) system, the method comprising:
obtaining control resource configuration information from DCI received from a base station;
determining a DCI transmission region;
determining a target search region according to preset reference information and the DCI transmission region, wherein the preset reference information comprises a blind detection control channel element (CCE) aggregation level or physical resource configuration information sent by the base station; and
detecting target DCI from the target search region according to a preset blind detection CCE aggregation level.

14. The method according to claim 13, wherein the preset reference information comprises the blind detection CCE aggregation level, and determining the target search region according to the preset reference information and the DCI transmission region comprises:
determining a blind detection CCE aggregation level of a region to be detected, wherein the region to be detected comprises at least one of the DCI transmission region or a mapping region of the DCI transmission region;
in response to that the blind detection CCE aggregation level is equal to a maximum value of CCEs supported by the region to be detected, determining a valid region of the entire region to be detected as the target search region, wherein the valid region is a region of the entire region to be detected excluding a cell reference signal (CRS) resource; and
in response to that the blind detection CCE aggregation level is less than the maximum value of CCEs supported by the region to be detected, determining the region to be detected excluding the target resource region as the target search region.

15. The method according to claim 13, wherein the preset reference information comprises the physical resource configuration information sent by the base station, and determining the target search region according to the preset reference information and the DCI transmission region comprises:
determining a preset resource mapping mode of a region to be detected according to the physical resource configuration information, wherein the region to be detected comprises the DCI transmission region or a mapping region of the DCI transmission region;
in response to that the preset resource mapping mode is a first mapping mode, determining the region to be detected excluding the target resource region as the target search region; and
in response to that the preset resource mapping mode is a second mapping mode, determining a valid region of the entire region to be detected as the target search region, wherein the valid region is a region of the region to be detected excluding a CRS resource;
wherein the first mapping mode is configured to map a target physical resource in a data region of the original LTE system, and the target physical resource carries the DCI of the MTC device; and
the second mapping mode is configured to map the target physical resource in a valid region of a subframe, and the valid region of the subframe is a time/frequency region excluding a CRS resource in the subframe.

16. The method according to claim 13, further comprising:
reporting device capability information to the base station, wherein the device capability information indicates whether the MTC device has an ability to search for the DCI from the target resource region, such that the base station maps a target physical resource for carrying the DCI in a preset DCI transmission region according to the device capability information.

17. A machine type communication (MTC) device, comprising:
a processor, and
a memory for storing instructions executable by the processor,
wherein the processor is configured to:
obtain control resource configuration information from downlink control information (DCI) received from a base station, and determining a DCI transmission region;
determine a target search region according to preset reference information and the DCI transmission region, wherein the preset reference information comprises a blind detection control channel element (CCE) aggregation level or physical resource configuration information sent by the base station; and
detect target DCI from the target search region according to a preset blind detection CCE aggregation level.

18. The MTC device according to claim 17, wherein the preset reference information comprises the blind detection CCE aggregation level, and the processor is further configured to:
determine a blind detection CCE aggregation level of a region to be detected, wherein the region to be detected comprises at least one of the DCI transmission region or a mapping region of the DCI transmission region;
in response to that the blind detection CCE aggregation level is equal to a maximum value of CCEs supported by the region to be detected, determine a valid region of the entire region to be detected as the target search region, wherein the valid region is a region of the entire region to be detected excluding a cell reference signal (CRS) resource; and in response to that the blind detection CCE aggregation level is less than the maximum value of CCEs supported by the region to be detected, determine the region to be detected excluding the target resource region as the target search region.

19. The MTC device according to claim 17, wherein the preset reference information comprises the physical resource configuration information sent by the base station, and the processor is further configured to:

determine a preset resource mapping mode of a region to be detected according to the physical resource configuration information, wherein the region to be detected comprises the DCI transmission region or a mapping region of the DCI transmission region;

in response to that the preset resource mapping mode is a first mapping mode, determine the region to be detected excluding the target resource region as the target search region; and in response to that the preset resource mapping mode is a second mapping mode, determine a valid region of the entire region to be detected as the target search region, wherein the valid region is a region of the region to be detected excluding a CRS resource;

wherein the first mapping mode is configured to map a target physical resource in a data region of the original LTE system, and the target physical resource carries DCI of the MTC device; and the second mapping mode is configured to map the target physical resource in a valid region of a subframe, and the valid region of the subframe is a time/frequency region excluding a CRS resource in the subframe.

20. The MTC device according to claim 17, wherein the processor is further configured to:

report device capability information to the base station, wherein the device capability information indicates whether the MTC device has an ability to search for DCI from the target resource region, such that the base station maps a target physical resource for carrying the DCI in a preset DCI transmission region according to the device capability information.

\* \* \* \* \*